United States Patent
Ball

(10) Patent No.: US 11,530,014 B2
(45) Date of Patent: Dec. 20, 2022

(54) MAGNETIC ENGAGEMENT MECHANISM FOR A RECREATIONAL AND/OR TRANSPORTATION APPARATUS

(71) Applicants: Smart Clips LLC, Basking Ridge, NJ (US); Magswitch Technology, Inc., Lafayette, CO (US)

(72) Inventor: Steven Ball, Sarasota, FL (US)

(73) Assignees: Smart Clips LLC, Sarasota, FL (US); Magswitch Technology, Inc., Lafayette, CO (US)

( * ) Notice: Subject to any disclaimer, the term of this patent is extended or adjusted under 35 U.S.C. 154(b) by 0 days.

(21) Appl. No.: 17/165,407

(22) Filed: Feb. 2, 2021

(65) Prior Publication Data
US 2021/0253195 A1    Aug. 19, 2021

Related U.S. Application Data

(63) Continuation of application No. 16/742,110, filed on Jan. 14, 2020, now Pat. No. 10,906,606, which is a
(Continued)

(51) Int. Cl.
| B62M 3/08 | (2006.01) |
| A43B 5/14 | (2006.01) |
| A43B 1/00 | (2006.01) |

(52) U.S. Cl.
CPC .......... *B62M 3/086* (2013.01); *A43B 1/0054* (2013.01); *A43B 5/14* (2013.01)

(58) Field of Classification Search
CPC ....... B62M 3/086; B62M 3/08; A43B 1/0054; A43B 5/14; H01F 7/04; H01F 7/0252
See application file for complete search history.

(56) References Cited

U.S. PATENT DOCUMENTS

| 3,537,719 A | 11/1970 | Gottfried |
| 4,419,644 A | 12/1983 | Baermann |
| (Continued) | | |

FOREIGN PATENT DOCUMENTS

| CN | 1762760 A | 4/2006 |
| CN | 202022288 U | 11/2011 |
| (Continued) | | |

OTHER PUBLICATIONS

International Search Report of the International Searching Authority dated Oct. 6, 2021, issued in connection with International Application No. PCT/US2021/39861 (3 pages).
(Continued)

*Primary Examiner* — Luis A Gonzalez
(74) *Attorney, Agent, or Firm* — McCarter & English, LLP

(57) ABSTRACT

Exemplary embodiments are directed to a pedal for a bicycle that includes a body, a spindle rotatably secured to the body and for connection with the bicycle, a first magnetic platter non-rotatably secured within the body, and a second magnetic platter rotatably secured within the body and overlaying the first magnetic platter. The first and second magnetic platters each include two magnetic blocks that are separated and magnetically charged by a respective permanent magnet plate positioned therebetween. The second magnetic platter includes a keyed protrusion configured to be engaged by a ferrous metal cleat, which can rotate the second magnetic platter between a first position where the pedal is in a magnetically inactive state and a second position where the pedal is in a magnetically active state magnetically securing the cleat to the second magnetic platter.

19 Claims, 12 Drawing Sheets

Related U.S. Application Data continuation of application No. 16/208,158, filed on Dec. 3, 2018, now Pat. No. 10,532,791.

(60) Provisional application No. 62/594,830, filed on Dec. 5, 2017.

(56) References Cited

U.S. PATENT DOCUMENTS

| | | | |
|---|---|---|---|
| 5,473,963 | A | 12/1995 | Aeschbach |
| 5,704,256 | A | 1/1998 | De Lattre |
| 6,707,360 | B2 | 3/2004 | Underwood et al. |
| 7,102,476 | B1 | 9/2006 | Shen |
| 7,161,451 | B2 | 1/2007 | Shen |
| 8,350,663 | B1 | 1/2013 | Michael |
| 10,532,791 | B2 | 1/2020 | Ball |
| 10,906,606 | B2 | 2/2021 | Ball et al. |
| 11,130,547 | B2 * | 9/2021 | Fowler .................. B62M 3/086 |
| 2002/0105400 | A1 | 8/2002 | Underwood et al. |
| 2006/0232367 | A1 | 10/2006 | Shen |
| 2008/0040937 | A1 | 2/2008 | Champoux et al. |
| 2009/0288316 | A1 | 11/2009 | Fullerton et al. |
| 2010/0236095 | A1 | 9/2010 | Reed |
| 2010/0308549 | A1 | 12/2010 | Rivard |
| 2011/0248806 | A1 | 10/2011 | Michael |
| 2013/0269477 | A1 | 10/2013 | Williams |
| 2016/0304156 | A1 | 10/2016 | Pepito |
| 2017/0190381 | A1 | 7/2017 | Casey |
| 2017/0253295 | A1 | 9/2017 | Wu |
| 2019/0152559 | A1 | 5/2019 | Jentzsch |
| 2019/0168842 | A1 | 6/2019 | Ball |
| 2020/0148303 | A1 | 5/2020 | Ball et al. |
| 2020/0185137 | A1 | 6/2020 | Morton et al. |
| 2021/0129936 | A1 * | 5/2021 | Fowler ..................... H01F 7/02 |

FOREIGN PATENT DOCUMENTS

| | | |
|---|---|---|
| CN | 103988267 A | 8/2014 |
| CN | 106585843 A | 4/2017 |
| EP | 1972221 A2 | 9/2008 |
| FR | 2719231 A1 | 11/1995 |
| KR | 20100094350 A | 8/2010 |
| KR | 20110078486 A | 7/2011 |
| KR | 20170044843 A | 4/2017 |

OTHER PUBLICATIONS

Written Opinion of the International Searching Authority dated Oct. 6, 2021, issued in connection with International Application No. PCT/US2021/39861 (5 pages).

International Search Report of the International Searching Authority dated Feb. 19, 2019, issued in connection with International Application No. PCT/US2018/63654 (3 pages).

Written Opinioin of the International Searching Authority dated Feb. 19, 2019, issued in connection with International Application No. PCT/US2018/63654 (4 pages).

Notice of Allowance dated Aug. 14, 2019, issued in connection with U.S. Appl. No. 16/208,158 (9 pages).

Notice of Allowance dated Jun. 15, 2020, issued in connection with U.S. Appl. No. 16/742,110 (8 pages).

Notice of Allowance dated Sep. 29, 2020, issued in connection with U.S. Appl. No. 16/742,110 (5 pages).

Office Action dated Jun. 3, 2021, along with an English translation, issued by the State Intellectual Property Office of People's Republic of China, issued in connection with Chinese Patent Application No. 201880088435.2 (12 pages).

Extended European Search Report dated Jun. 23, 2021, issued by the European Patent Office, issued in connection with European Patent Application No. 18885067.1 (6 pages).

Office Action dated Sep. 13, 2022, issued in connection with U.S. Appl. No. 17/363,509 (8 pages).

* cited by examiner

MAGNETIC ENGAGEMENT MECHANISM FOR A RECREATIONAL AND/OR TRANSPORTATION APPARATUS

CROSS-REFERENCE TO RELATED APPLICATIONS

This application is a Continuation of, and claims priority to U.S. patent application Ser. No. 16/742,110, filed Jan. 14, 2020, and issued as U.S. Pat. No. 10,906,606 on Feb. 2, 2021, which is a Continuation of, and claims priority to, U.S. patent application Ser. No. 16/208,158, filed Dec. 3, 2018, and issued as U.S. Pat. No. 10,532,791 on Jan. 14, 2020, which claims the benefit of U.S. Provisional Patent Application No. 62/594,830, filed on Dec. 5, 2017. The entire content and disclosures of all of the above are expressly incorporated herein by reference.

TECHNICAL FIELD

The present disclosure relates to magnetic engagement mechanisms for recreational and/or transportation apparatuses, such as bicycles, skis, snowboards, etc., so as to engage the covering (e.g., a shoe) of an appendage (e.g., the foot) to the apparatus.

BACKGROUND

Users of recreational and/or transportation apparatuses, e.g., bicycles (indoor and outdoor), skis, and snowboards, are often secured to their respective apparatus while also being able to reliably disengage therefrom. In the case of a bicycle, "clipless" pedals are utilized which include clip-in pedals secured to the bicycle and a cleat attached to the bottom of each of the cyclist's shoes. "Clipless" pedals allow for the bicyclist to removably secure their shoes (and feet) to the bicycle pedals. The clip-in pedals can be spring loaded and permit the user to insert the cleat, depress the spring-loaded portion of the pedal, and secure the cleat to top plates of the pedal. By being clipped in, the cyclist will have increased power transfer through the pedal stroke, increased efficiency, and better control, among other benefits. However, when a cyclist wishes to stop they must unclip their shoe from the pedal instead of simply taking their feet off of the pedals. Additionally, if the cyclist is in an accident they will want to be able to unclip from the pedals quickly and effortlessly. To unclip and release the cleat from the pedal, the cyclist will generally twist their heel outwards until the cleat is released from the pedal. This unclipping process can at times be difficult and the cleat can become stuck in the pedal. In the case of an accident, the failure of a cleat to disengage a pedal can increase the risk or severity of an injury. Accordingly, what is needed is a "clipless" pedal that is secure but can also be easily and reliably disengaged.

Modular permanent magnet workpiece chucks are known in the art. For example, U.S. Pat. No. 7,161,451, which is hereby incorporated by reference in its entirety, discloses a permanent magnet chuck for holding or lifting workpieces. This type of chuck can include two magnetic layers that are stacked over one another and encased in a housing. Each of the magnetic layers are made up of a series of soft magnet blocks that are positioned about a center and divided by permanent magnet plates. That is, each magnetic layer comprises alternating soft magnetic blocks and permanent magnet plates. The magnetic layers can be, for example, square or circular shaped. If square shaped, the magnetic layers can contain an even number of soft magnet blocks, for example, two or four, that are shaped as cubes or rectangular prisms. If circular shaped, the magnetic layers can contain an even number of soft magnet blocks, for example, two, four, six, etc., that are shaped as circular sector prisms, e.g., extruded pie slices. The permanent magnet plates have two major faces that are positioned adjacent the interposed soft magnetic blocks. The first major face has a north magnetic polarity and the second major face, which is opposite the first major face, has a south magnetic polarity. The permanent magnet plates are positioned between adjacent soft magnetic blocks extending generally from the center of the magnetic layer to the perimeter, and such that each soft magnetic block is adjacent either only north magnetic faces or south magnetic faces of the two bordering permanent magnet plates, but not a north magnetic face and a south magnetic face. The soft magnetic blocks that are adjacent north magnetic faces will have a north polarity while the soft magnetic blocks that are adjacent south magnetic faces will have a south polarity. As a result, the soft magnetic blocks alternate between north polarity blocks and south polarity blocks, e.g., a first block has a north polarity, a second subsequent block has a south polarity, a third subsequent block has a north polarity, and soon. One of the magnetic layers can be connected to an external lug-nut that allows for the magnetic layer to be rotated by a tool, e.g., a wrench.

Each of the magnetic layers are configured as described above, and are placed on top of one another. The first and second magnetic layers can be overlapped in two different positions, an unaligned position and an aligned position. In the unaligned position, the polarity of the soft magnetic blocks of the first and second magnetic layers that overlap each other are of opposite polarity, e.g., the north polarity soft magnetic blocks of the first layer overlay the south polarity soft magnetic blocks of the second layer, and the south polarity soft magnetic blocks of the first layer overlay the north polarity soft magnetic blocks of the second layer. In this unaligned position, the magnetic flux lines are close-circuited, which prevents the magnetic force from extending beyond the first and second magnetic layers. As such, this unaligned position is known as a magnetically inactive state since the permanent magnet chuck will not exert a significant magnetic force on an external workpiece made of a ferromagnetic material. In the aligned position, the polarity of the soft magnetic blocks of the first and second magnetic layers that overlap each other are of the same polarity, e.g., the north polarity soft magnetic blocks of the first layer overlay the north polarity soft magnetic blocks of the second layer, and the south polarity soft magnetic blocks of the first layer overlay the south polarity soft magnetic blocks of the second layer. In this aligned position, the magnetic circuits are incomplete and open, allowing magnetic force to extend beyond the first and second magnetic layers. As such, this aligned position is known as a magnetically active state since the permanent magnet chuck will exert a magnetic force on an external workpiece made of a ferromagnetic material and thus secure the external workpiece to the permanent magnet chuck.

The permanent magnet chuck can be switched between the active and inactive positions by rotating one of the magnetic layers with respect to the other magnetic layer by using a tool to rotate the external lug-nut so that the polarity of the soft magnetic blocks is either aligned or unaligned. The degree of rotation to switch between positions is determined by the number of soft magnetic blocks. If four soft magnetic blocks are used then the first magnetic layer will have to be rotated 90° (e.g., one quarter of a full circle) with respect to the second magnetic layer to switch between active and inactive positions. If six soft magnetic blocks are used then the first magnetic layer will have to be rotated 60° (e.g., one sixth of a full circle) with respect to the second magnetic layer to switch between active and inactive positions.

The permanent magnet chuck as described above and in U.S. Pat. No. 7,161,451 is known to be implemented with a work-holding device used in machining operations, e.g., for grinders, lathes, and mills, and for material handling purposes. For work-holding applications, the permanent magnet chuck would hold a material that is being worked on, e.g., a piece of metal that is being lathed. However, the permanent magnet chuck of the prior art is not directed to magnetically securing the device or tool that is used to activate the permanent magnet chuck.

The present disclosure addresses the foregoing drawback and others by providing magnetic engagement mechanisms for recreational and/or transportation apparatuses, and/or by providing same that can be activated and de-activated by a user's foot or other appendage and releasably secures the user's foot or other appendage to the apparatus so that it can be quickly and reliably connected and disconnected through rotational activation of two magnetic platters.

SUMMARY

Example embodiments of the present disclosure relate to magnetic engagement mechanisms for recreational and/or transportation apparatuses, such as bicycles, skis, snowboards, etc.

More particularly, a magnetic engagement mechanism for transportation apparatuses is provided according to embodiments of the present disclosure. In some example embodiments, the magnetic engagement mechanism includes two magnetic platters that can be rotated with respect to one another between a first magnetically inactive position and a second magnetically active position for engaging a ferrous cleat.

In some example embodiments, a pedal for a bicycle includes a body, a spindle assembly rotatably secured to the body and configured to be connected to the bicycle, a first magnetic platter positioned and non-rotatably secured within the body, and a second magnetic platter positioned and rotatably secured within the body overlaying the first magnetic platter. The first magnetic platter includes at least two blocks and at least one permanent magnet plate having a magnetic north face and a magnetic south face. The at least one permanent magnet plate of the first magnetic platter is positioned between the at least two blocks with a first of the at least two blocks adjacent the magnetic north face and a second of the at least two blocks adjacent the magnetic south face, such that the at least one permanent magnet plate magnetizes the first of the at least two blocks with a magnetic north polarity and the second of the at least two blocks with a magnetic south polarity. The second magnetic platter includes at least two blocks, at least one permanent magnet plate having a magnetic north face and a magnetic south face, and a keyed protrusion configured to be engaged by a ferrous metal cleat. The at least one permanent magnet plate of the second magnetic platter is positioned between the at least two blocks with a first of the at least two blocks adjacent the magnetic north face and a second of the at least two blocks adjacent the magnetic south face, such that the at least one permanent magnet plate magnetizes the first of the at least two blocks with a magnetic north polarity and the second of the at least two sections with a magnetic south polarity. The second magnetic platter is rotatable by the ferrous metal cleat between a first position where the first of the at least two blocks of the second magnetic platter overlays the second of the at least two blocks of the first magnetic platter and the second of the at least two blocks of the second magnetic platter overlays the first of the at least two blocks of the first magnetic platter, and a second position where the first of the at least two blocks of the second magnetic platter overlays the first of the at least two blocks of the first magnetic platter and the second of the at least two blocks of the second magnetic platter overlays the second of the at least two blocks of the first magnetic platter. When the second magnetic platter is in the first position the pedal is in a magnetically inactive state and the cleat is not magnetically secured to the second magnetic platter. When the second magnetic platter is in the second position the pedal is in a magnetically active state and the cleat is magnetically secured to the second magnetic platter.

In accordance with embodiments of the present disclosure a pedal for a bicycle is provided that includes a body, a spindle assembly rotatably secured to the body and configured to be connected to the bicycle, a first magnetic platter positioned and non-rotatably secured within the body, and a second magnetic platter positioned and rotatably secured within the body overlaying the first magnetic platter. The first magnetic platter includes an even number of permanent magnet plates that each have a magnetic north face and a magnetic south face, and a plurality of blocks. At least one block of the plurality of blocks is positioned between each adjacent pair of permanent magnet plates, such that the permanent magnet plates magnetize each of the plurality of blocks with either a magnetic north polarity or a magnetic south polarity with adjacent blocks having opposite magnetic polarities. The second magnetic platter includes an even number of permanent magnet plates each having a magnetic north face and a magnetic south face, a plurality of blocks, and a keyed protrusion configured to be engaged by a ferrous metal cleat. At least one block of the plurality of blocks is positioned between each adjacent pair of permanent magnet plates, such that the permanent magnet plates magnetizes each of the plurality of blocks with either a magnetic north polarity or a magnetic south polarity with adjacent blocks having opposite magnetic polarities. The second magnetic platter is rotatable by the ferrous metal cleat between a first position where the magnetic south polarity blocks of the second magnetic platter overlay the magnetic north polarity blocks of the first magnetic platter and the magnetic north polarity blocks of the second magnetic platter overlay the magnetic south polarity blocks of the first magnetic platter, and a second position where the magnetic south polarity blocks of the second magnetic platter overlay the magnetic south polarity blocks of the first magnetic platter and the magnetic north polarity blocks of the second magnetic platter overlay the magnetic north polarity blocks of the first magnetic platter. When the second magnetic platter is in the first position the pedal is in a magnetically inactive state and the cleat is not magnetically secured to the second magnetic platter, and when the second magnetic platter is in the second position the pedal is in a magnetically active state and the cleat is magnetically secured to the second magnetic platter.

In accordance with additional embodiments of the present disclosure a magnetic engagement mechanism for a recreational and/or transportation apparatus is provided that includes a body, a first magnetic platter positioned and non-rotatably secured within the body, and a second magnetic platter positioned and rotatably secured within the body overlaying the first magnetic platter. The first magnetic platter includes an even number of permanent magnet plates that each have a magnetic north face and a magnetic south face, and a plurality of blocks. At least one block of the plurality of blocks is positioned between each adjacent pair of permanent magnet plates, such that the permanent magnet plates magnetize each of the plurality of blocks with either a magnetic north polarity or a magnetic south polarity with adjacent blocks having opposite magnetic polarities. The second magnetic platter includes an even number of permanent magnet plates each having a magnetic north face and a magnetic south face, a plurality of blocks, and a keyed protrusion configured to be engaged by a ferrous metal cleat. At least one block of the plurality of blocks is positioned between each adjacent pair of permanent magnet plates, such that the permanent magnet plates magnetizes each of the plurality of blocks with either a magnetic north polarity or a magnetic south polarity with adjacent blocks having opposite magnetic polarities. The second magnetic platter is rotatable by the ferrous metal cleat between a first position where the magnetic south polarity blocks of the second magnetic platter overlay the magnetic north polarity blocks of the first magnetic platter and the magnetic north polarity blocks of the second magnetic platter overlay the magnetic south polarity blocks of the first magnetic platter, and a second position where the magnetic south polarity blocks of the second magnetic platter overlay the magnetic south polarity blocks of the first magnetic platter and the magnetic north polarity blocks of the second magnetic platter overlay the magnetic north polarity blocks of the first magnetic platter. When the second magnetic platter is in the first position the magnetic engagement mechanism is in a magnetically inactive state and the cleat is not magnetically secured to the second magnetic platter, and when the second magnetic platter is in the second position the magnetic engagement mechanism is in a magnetically active state and the cleat is magnetically secured to the second magnetic platter.

In accordance with additional embodiments of the present disclosure, a pedal for a bicycle comprises a body, a spindle assembly rotatably secured to the body and configured to be connected to said bicycle, a first magnetic platter positioned and non-rotatably secured within the body, and a second magnetic platter positioned and rotatably secured within the body overlaying the first magnetic platter. The first magnetic platter includes a first magnetic block, a second magnetic block, and a first permanent magnet plate positioned between and separating the first and second magnetic blocks. The first permanent magnet plate magnetizes the first magnetic block with a magnetic north polarity and the second magnetic block with a magnetic south polarity. The second magnetic platter includes a third magnetic block, a fourth magnetic block, a second permanent magnet plate positioned between and separating the third and fourth magnetic blocks, and a keyed protrusion that is configured to be engaged by a ferrous metal cleat to rotate the second magnetic platter between a first position and a second position. The second permanent magnet plate magnetizes the third magnetic block with a magnetic north polarity and the fourth magnetic block with a magnetic south polarity. When the second magnetic platter is in the first position, the third magnetic block overlays the second magnetic block and the fourth magnetic block overlays the first magnetic block, thus placing the pedal in a magnetically inactive state. When the second magnetic platter is in the second position, the third magnetic block overlays the first magnetic block and the fourth magnetic block overlays the second magnetic block, thus placing the pedal in a magnetically active state whereby the cleat is magnetically secured to the second magnetic platter.

BRIEF DESCRIPTION OF THE DRAWINGS

The foregoing features of the invention will be apparent from the following Detailed Description, taken in connection with the accompanying drawings, in which.

DETAILED DESCRIPTION

The present disclosure relates to magnetic engagement mechanisms for recreational and/or transportation apparatuses, as discussed in detail below in connection with FIGS. 1-13.

Figure 1:
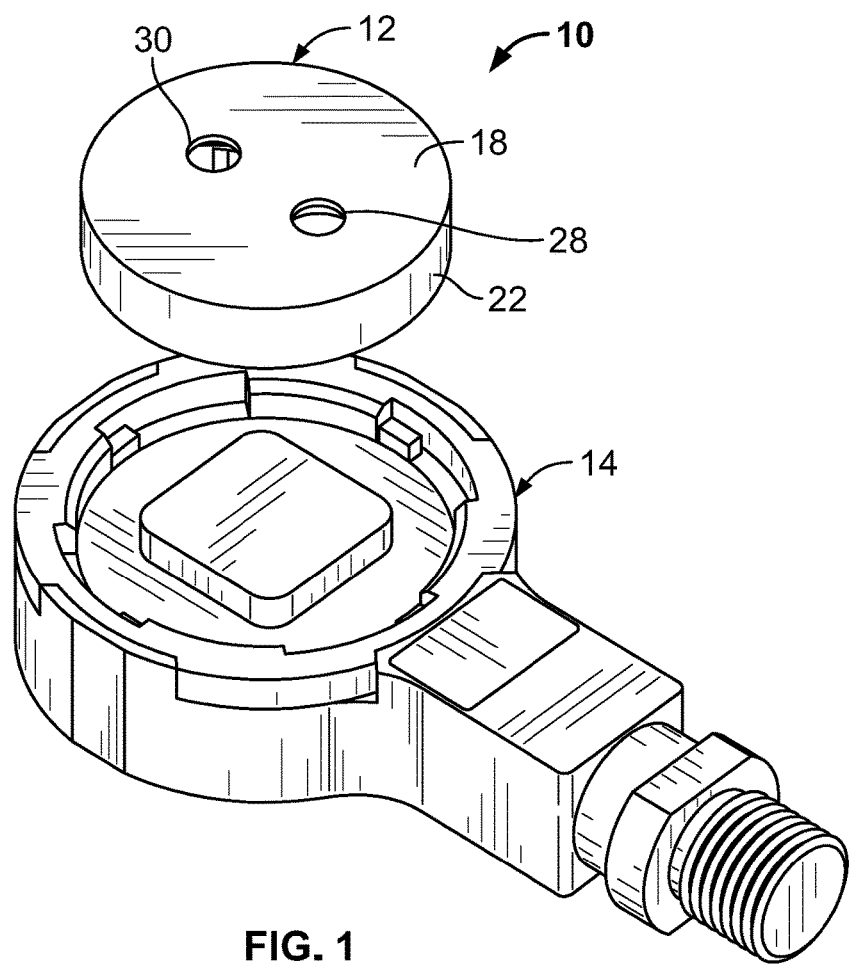
FIG. 1 is an exploded perspective view of a magnetic engagement mechanism for a transportation apparatus.
Figure 2:
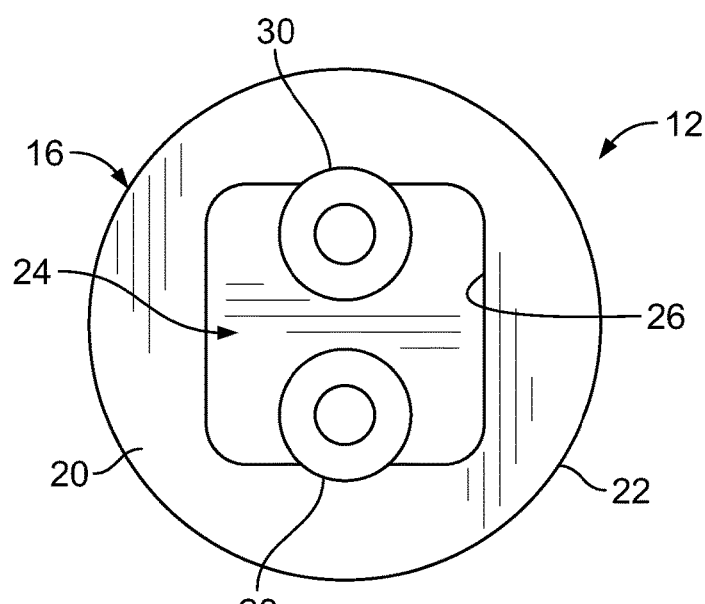
FIG. 2 is a bottom view of a cleat of the magnetic engagement mechanism of FIG. 1.
Figure 3:
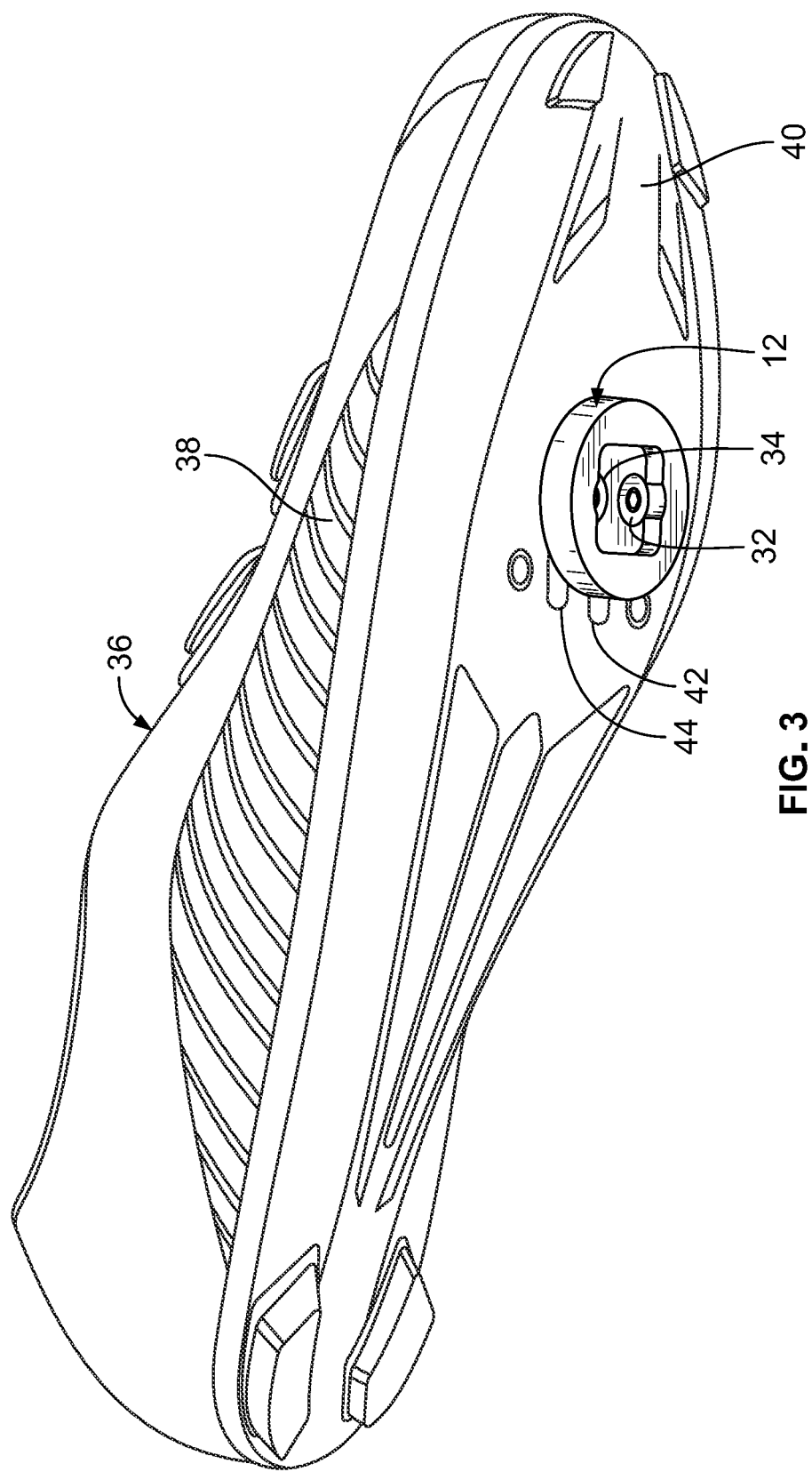
FIG. 3 is a perspective view of the cleat of FIG. 2 secured to a shoe.
Figure 4:
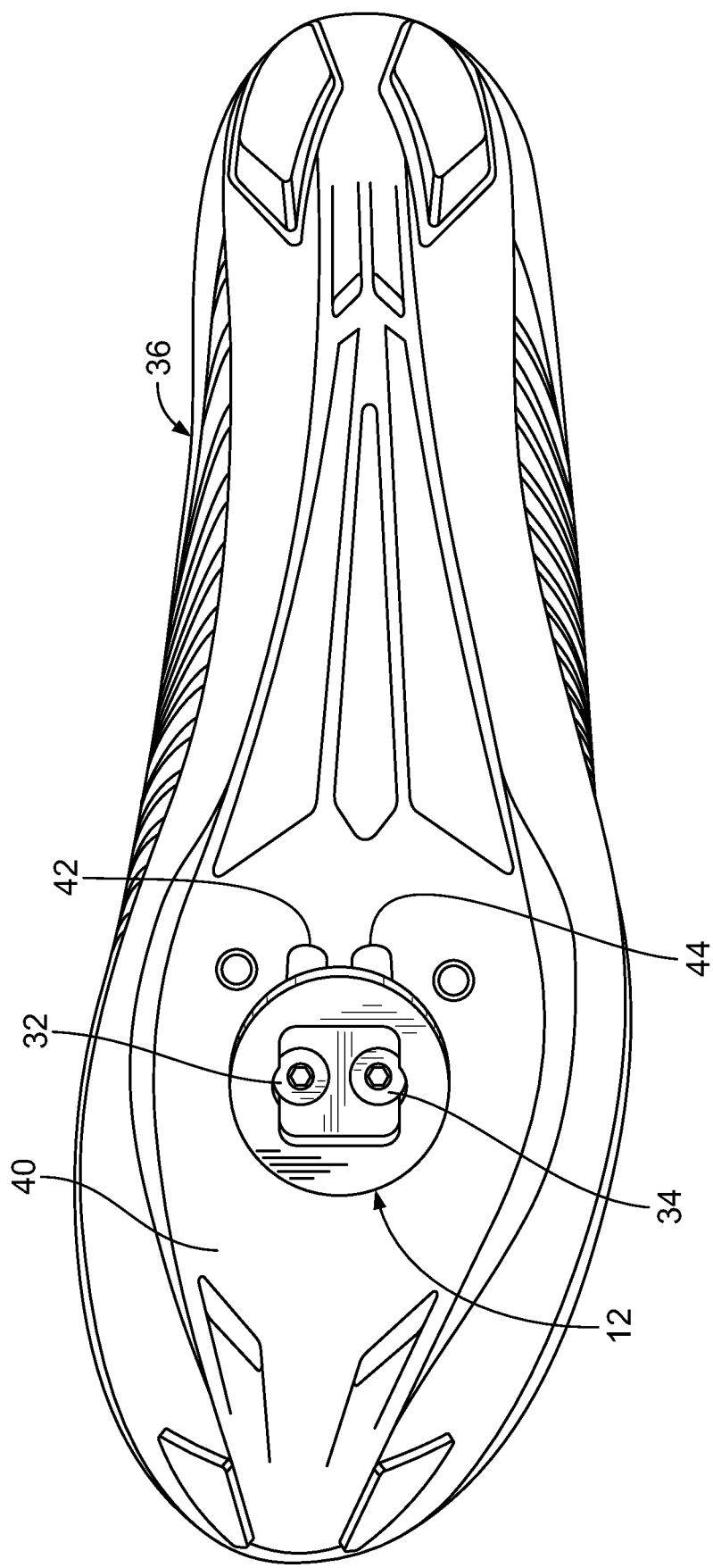
FIG. 4 is a bottom view of the cleat of FIG. 2 secured to a shoe.

FIG. 1 is a perspective view of a magnetic engagement mechanism 10 for a transportation apparatus, e.g., a bicycle (indoor or outdoor), skis, a snowboard, etc. The magnetic engagement mechanism 10 includes a cleat 12 and a pedal 14. FIG. 2 is a bottom view of the cleat 12. The cleat 12 includes a body 16 having a top surface 18, a bottom surface 20, and an outer perimeter wall 22. The body 16 can be generally cylindrical in shape. The body 16 additionally includes a keyed recess 24 defined by a keyed perimeter 26. The keyed recess 24 extends into the body 16 from the bottom surface 20. The keyed recess 24 is configured to engage a portion of the pedal 14, discussed in greater detail below. The body 16 additionally includes two holes 28, 30 that extend through the body 16. The holes 28, 30 can be positioned in the recess 24, as shown in FIG. 2, and extend through the top surface 18, or they can be positioned outside of the recess 24 and extend from the bottom surface 20 to the top surface 18. The holes 28, 30 allow for screws 32, 34 (see FIGS. 3 and 4) to be inserted therethrough to secure the cleat 12 to a shoe 36 and prevent rotation relative thereto, as shown in FIGS. 3 and 4. The holes 28, 30 can have a tapered wall so that the screw heads lay flush. The cleat 12 is shown with two holes 28, 30, however, it should be understood that the cleat 12 can include any number of holes desired that will allow the cleat 12 to be secured to the shoe 36. Use is also contemplated of other suitable means for securing the cleat to a shoe, boot, or other appendage covering.

FIGS. 3 and 4 are perspective and bottom views, respectively, showing the cleat 12 secured to the shoe 36. The shoe 36 can be a standard cycling shoe that includes an upper 38 and a sole 40. The sole 40 can be made of a rigid material, e.g., a hard plastic, and can include first and second tracks 42, 44. The first and second tracks 42, 44 allow the screws 32, 34 to be secured thereto at various positions along the length thereof, thus allowing the cleat 12 to be secured to the shoe 36 at different positions as desired. For example, the tracks 42, 44 can include a trapped nut (not shown) that can slide within the tracks 42, 44 and which can be engaged by the screws 32, 34.

Figure 5:
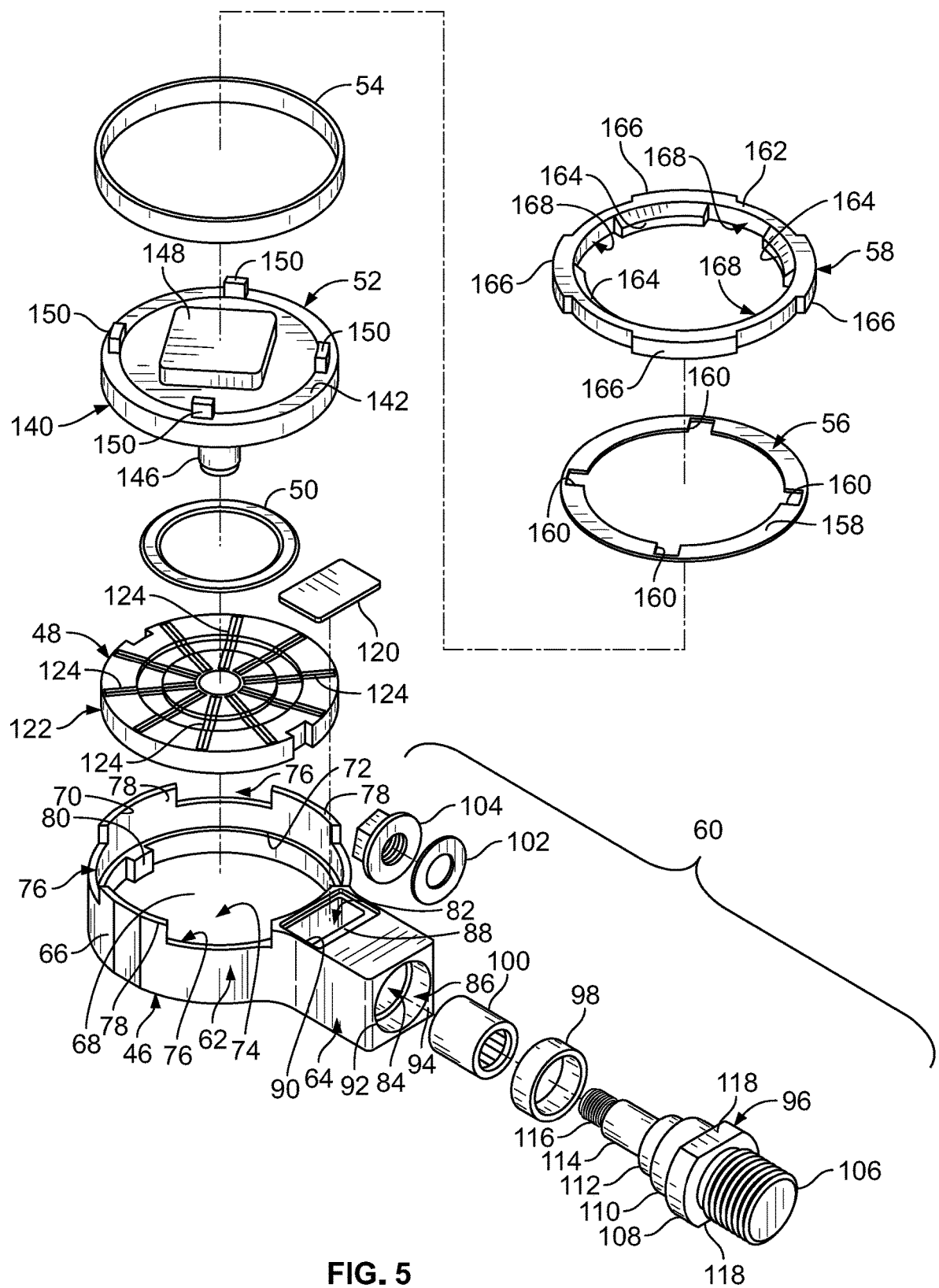
FIG. 5 is an exploded view of a pedal of the magnetic engagement mechanism of FIG. 1.
Figure 6:
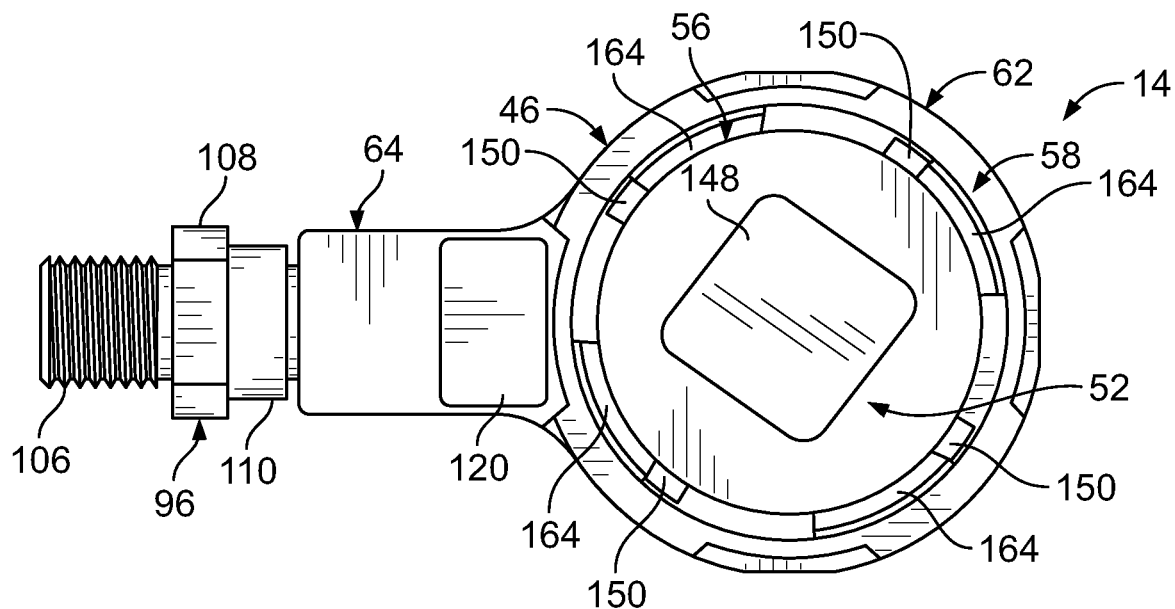
FIG. 6 is a top view of the pedal of FIG. 5.
Figure 7:
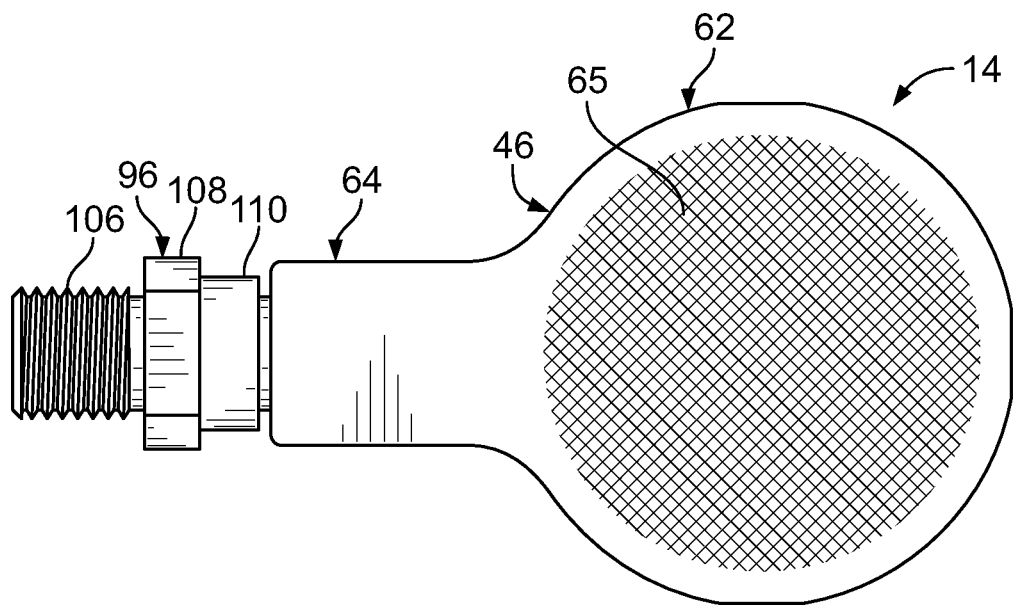
FIG. 7 is a bottom view of the pedal of FIG. 5.

FIG. 5 is an exploded view of the pedal 14. The pedal 14 includes a body 46, a first magnetic platter 48, an annular platter bushing 50, a second magnetic platter 52, an annular platter bushing 54, a top disc 56, a platter retention ring 58, and a spindle assembly 60. The body 46 includes a platter holder 62 and a stem 64. The body 46 can be unitary in nature such that it is formed from a single piece of material to increase strength and rigidity. FIGS. 6 and 7 are respectively top and bottom views of the pedal 14. As shown in FIG. 7, the back of the body 46 can include texturing 65, e.g., knurling, that allows a user to more securely engage the pedal 14 when they are wearing regular shoes or do not desire to magnetically lock their shoes 36 to the pedal 14.

As shown in FIG. 5, the platter holder 62 includes an annular sidewall 66, a bottom wall 68, a top opening 70, and an inner annular shoulder 72. The platter holder 62 defines an inner chamber 74 for housing the first magnetic platter 48, the annular platter bushing 50, the second magnetic platter 52, the annular platter bushing 54, and the top disc 56. The annular sidewall 66 includes a plurality of removed sections 76 adjacent the top opening 70 that form a plurality of abutments 78. The removed sections 76 are configured to receive a portion of the platter retention ring 58 while the abutments 78 are configured to prevent the platter retention ring 58 from rotating, discussed in greater detail below. The annular shoulder 72 includes one or more keys 80 that extend radially inward therefrom and are configured to engage the first magnetic platter 48 to prevent the first magnetic platter 48 from rotating relative to the platter holder 62.

The stem 64 defines an inner chamber 82, a bearing channel 84, and a bushing channel 86. The bearing channel 84 is generally smaller in diameter than the bushing channel 86. The stem 64 also includes a cover recess 88, an access opening 90 adjacent the cover recess 88, and a spindle opening 92, which is generally at a front face 94 of the stem 64 and adjacent the bushing channel 86 that is adjacent the bearing channel 84. The access opening 90 and the spindle opening 92 provide access to the inner chamber 82 and allow components of the spindle assembly 60 to be inserted into and positioned within the inner chamber 82, bearing channel 84, and bushing channel 86 of the stem 64.

The spindle assembly 60 includes a spindle 96, a bushing 98, a bearing 100, a washer 102, and a nut 104. The spindle 96 comprises a series of concentric components including a threaded outer extension 106, a head 108, a stop/spacer 110, a bushing mount 112, a bearing mount 114, and a threaded inner extension 116. The threaded outer extension 106 extends outwardly from the head 108 and is therefore positioned at the outer end of the spindle 96. The threaded outer extension 106 includes threading, e.g., %16"×20 tpi, configured to removably engage a threaded hole of a bicycle crankset crank arm. The head 108 is adjacent the threaded outer extension 106 and includes flattened sides 118 that can be engaged by a wrench or other tool to rotate the spindle 96, which assists in securing and tightening the threaded outer extension 106 to the threaded hole of a bicycle crankset crank arm. The stop/spacer 110 is a cylindrical component that extends from the head 108 opposite the threaded outer extension 106. The stop/spacer 110 is configured to engage the front face 94 of the stem 64 and prevent the spindle 96 from further insertion when the spindle 96 is engaged with the stem 64. Additionally, the stop/spacer 110 spaces the head 108 away from the stem 64 so that sufficient space is provided for the head 108 to be easily engaged by a tool. The bushing mount 112 is cylindrical in shape and extends from the stop/spacer 110 on the opposite side of the head 108. The bushing mount 112 has a smaller diameter than the stop/spacer 110 and is configured to be inserted into and surrounded by the bushing 98. That is, the bushing mount 112 is inserted into the bushing 98 and the bushing 98 is secured to the bushing mount 112, e.g., through a friction fit. The bearing mount 114 is also cylindrical in shape and extends from the bushing mount 112 on the opposite side of the stop/spacer 110. The bearing mount 114 has a smaller diameter than the bushing mount 112 and is configured to be inserted into and surround by the bearing 100. That is, the bearing mount 114 is inserted into the bearing 100 and the bearing 100 is secured to the bearing mount 114, e.g., through a friction fit. The threaded inner extension 116 is also cylindrical in shape and extends from the bearing mount 114 on the opposite side of the bushing mount 112. The threaded inner extension 116 includes threads that are configured to be engaged by the nut 104 to secure the spindle 96 to the stem 64.

The bushing 98 is configured to be inserted into and secured within the bushing channel 86 of the stem 64. The bushing 98 can be made of brass and reduces friction. As discussed, the bushing 98 is configured to receive and engage the bushing mount 112 of the spindle 96. The bearing 100 is configured to be inserted into and secured within the bearing channel 84 of the stem 64. The bearing 100 can be a needle roller bearing that allows a component on the interior thereof, e.g., the bearing mount 114 and therefore the spindle 96, to rotate while an outer ring of the bearing 100 is rotationally constrained. As discussed, the bearing 100 is configured to receive and engage the bearing mount 114 of the spindle 96 such that the spindle 96 can rotate within the bearing 100. When the bearing 100 is secured within the bearing channel 84 and the bushing 98 is secured within the bushing channel 86, the spindle 96 can be inserted through the spindle opening 92, the bushing 98, and the bearing 100 until the stop/spacer 110 contacts the front face 94 of the stem 64. When the spindle 96 is fully inserted, the bushing mount 112 will be surrounded by the bushing 98, the bearing mount 114 will be surrounded by the bearing 100, and the threaded inner extension 116 will be within the inner chamber 82 of the stem 64. The washer 102 and the nut 104 can then be inserted into the inner chamber 82 through the access opening 90 and placed over the threaded inner extension 116. The nut 104 can then be engaged with the threaded inner extension 116. The nut 104 can then be engaged by a tool, e.g., a wrench, and the head 108 can be engaged by a separate tool to tighten the nut 104 onto the threaded inner extension 116 of the spindle 96 to secure the spindle 96 to the stem 64. The washer 102 can be formed of polytetrafluoroethylene (PTFE) and used to reduce friction.

A cover 120 can be provided that can be positioned within the cover recess 88 and conceal the access opening 90. The cover 120 can be removably secured within the cover recess 88 such that it is flush with the outer walls of the stem 64, allowing a user to access the inner chamber 82 of the stem 64 when desired. For example, a user can remove the cover 120 to remove or replace the spindle 96, the bushing 98, or the bearing 100, or to grease the bearing 100.

Figure 8:
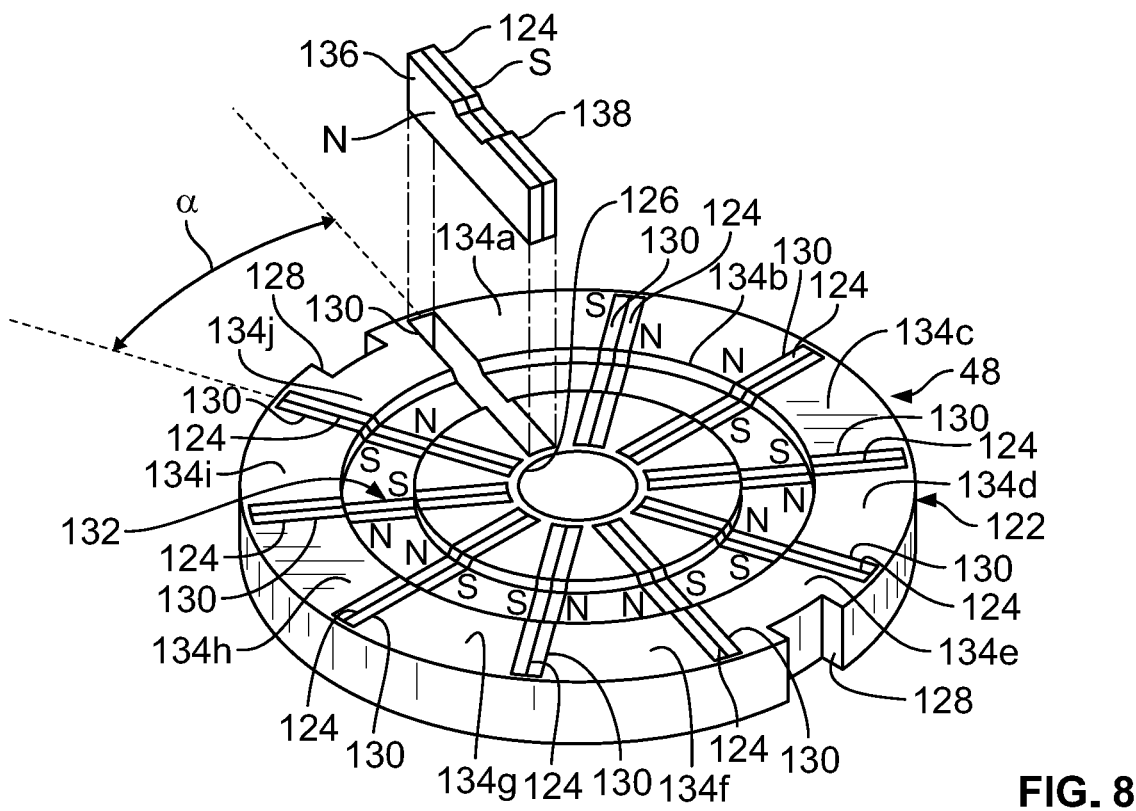
FIG. 8 is a top perspective view of a first magnetic platter of the pedal.

Turning to FIG. 8, a top perspective view of the first magnetic platter 48 is provided. The first magnetic platter 48 is generally circular in shape and includes a soft magnetic body 122 formed of a soft magnetic material, e.g., low carbon steel, and a plurality of permanent magnet plates 124. The soft magnetic body 122 includes a central hole 126, one or more peripheral notches 128, a plurality of radial slots 130, and an annular recess 132 configured to receive the annular platter bushing 50. The peripheral notches 128 extend radially inward from the outer perimeter of the soft magnetic body 122 and are configured to engage the keys 80 of the annular shoulder 72 of the platter holder 62. More specifically, the first magnetic platter 48 is sized and configured to be placed within the platter holder 62 and surrounded by the annular shoulder 72. When the first magnetic platter 48 is placed within the platter holder 62, the keys 80 engage the peripheral notches 128 and prevent the first magnetic platter 48 from rotating within the platter holder 62.

The plurality of radial slots 130 extend generally from the central hole 126 to the outer perimeter of the soft magnetic body 122 and are spaced from adjacent radial slots 130 by an angle α. Each of the radial slots 130 is spaced the same angle from adjacent radial slots 130, angle α, thus dividing the soft magnetic body 122 into an even number of equal sized soft-magnet blocks 134a-j. The embodiment shown in FIG. 8 has ten (10) radial slots 130, and ten (10) equally sized soft-magnet blocks 134a-j, which can be described as circular sector prisms in shape, are provided angularly spaced from each other by 36°. However, it should be understood that any even number of radial slots 130 can be utilized and are contemplated by this disclosure. For example, twelve (12) radial slots can be provided, which would result in twelve (12) equally sized blocks angularly spaced from each other by 30°, or, alternatively, fourteen (14) radial slots can be provided, which would result in fourteen (14) equally sized blocks angularly spaced from each other by approximately 25.71°. Sixteen, eighteen, twenty, etc., radial slots and equally sized blocks are also contemplated herein. The present disclosure further contemplates a preferred angle α being in the range of 20°-30°. In a preferred embodiment, the first magnetic platter 48 includes eighteen (18) radial slots 130 that are angularly spaced from each other by an angle α of 20°.

Each of the radial slots 130 is sized and configured to receive a permanent magnet plate 124. In a preferred embodiment where there are eighteen (18) radial slot 120, there will be eighteen (18) matching permanent magnet plates 124. Each permanent magnet plate 124 includes a first major face 136 and a second major face 138 opposite the first major face. The first major face 136 has either a north magnetic polarity or a south magnetic polarity while the second major face 138 has the opposite magnetic polarity, e.g., a south magnetic polarity if the first major face 136 has a north magnetic polarity or a north magnetic polarity if the first major face 136 has a south magnetic polarity. The permanent magnet plates 124 are positioned within the plurality of radial slots 130 so that major faces of the same magnetic polarity are facing each other and into the same soft-magnet block 134a-j such that each soft-magnet block 134a-j is adjacent either only north magnetic faces or only south magnetic faces of the bordering permanent magnet plates 124, but not a north magnetic face and a south magnetic face. The north and south magnetic faces of each permanent magnet plate 124 are labelled as "N" and "S" in FIG. 8 for illustrative purposes. When in such a configuration, the soft-magnet blocks 134b, 134d, 134f, 134h, 134j that are adjacent north magnetic faces will have a north polarity while the soft-magnet blocks 134a, 134c, 134e, 134g, 134i that are adjacent south magnetic faces will have a south polarity. As a result, the soft-magnet blocks 134a-j alternate between north polarity blocks and south polarity blocks.

Figure 9:
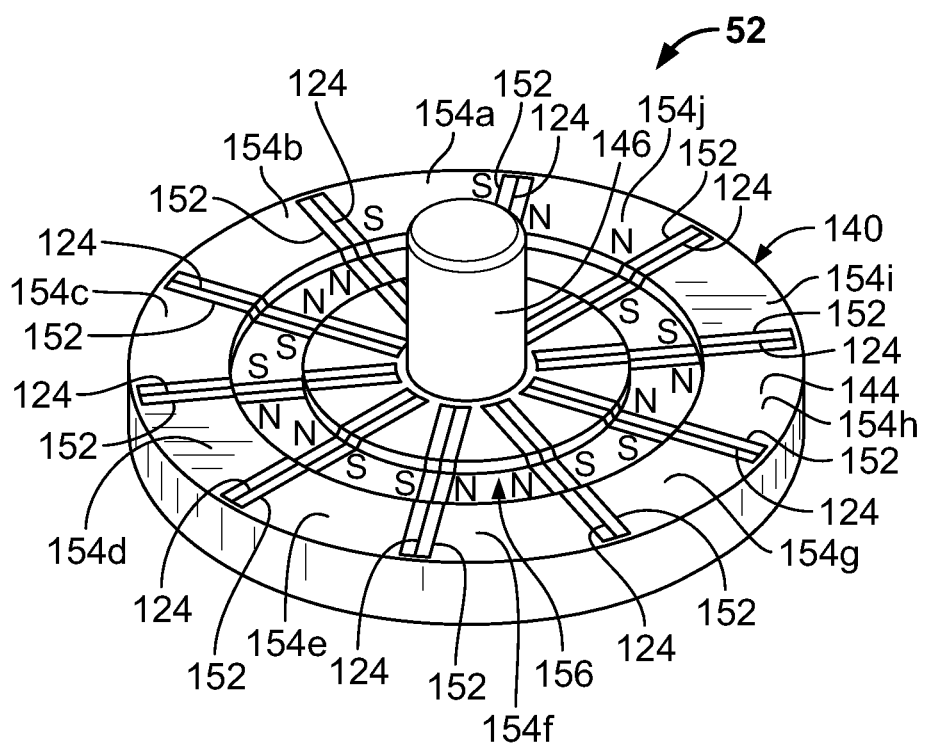
FIG. 9 is a bottom perspective view of a second magnetic platter of the pedal.

FIG. 9 is a bottom perspective view of the second magnetic platter 52, while FIG. 5 illustrates the second magnetic platter 52 from a top perspective view. The second magnetic platter 52 is generally circular in shape and includes a soft magnetic body 140 and a plurality of the permanent magnet plates 124. The soft magnetic body 140 has a top surface 142 and a bottom surface 144, and is formed of the same soft magnetic material, e.g., low carbon steel, as the soft magnetic body 122 of the first magnetic platter 48. The second magnetic platter 52 is similar in construction to the first magnetic platter 48, but with some additional components. The second magnetic platter 52 includes a central dowel pin 146, a keyed protrusion 148, and a plurality of blocks 150. The central dowel pin 146 extends from the center of the bottom surface 144 and is configured to be inserted into the central hole 126 of the first magnetic platter 48. The central dowel pin 146 can be constructed of stainless steel, for example. The keyed protrusion 148 extends from the center of the top surface 142 of the second magnetic platter 52. The keyed protrusion 148 has a matching shape to that of the keyed recess 24 of the cleat 12 so that it can be inserted into and received by the keyed recess 24. This keyed or mating configuration allows the cleat 12 to rotate the second magnetic platter 52 relative to the first magnetic platter 48 when the keyed protrusion 148 is received by the keyed recess 24. The keyed protrusion 148 is shown with a square configuration, though it is contemplated by the present disclosure that the keyed protrusion 148 and keyed recess 24 could have any matching geometry that allows the cleat 12 to rotate the second magnetic platter 52 when the keyed protrusion 148 is received by the keyed recess 24. For example, the keyed protrusion 148 and the keyed recess 24 could be triangular, pentagonal, star-shaped, etc. The plurality of blocks 150 extend from the top surface 142 of the second magnetic platter 52 and are equidistantly spaced generally along the perimeter of the second magnetic platter 52.

As referenced above, the second magnetic platter 52 is similar in construction to the first magnetic platter 48. Particularly, the second magnetic platter 52 includes a plurality of radial slots 152 that extend generally from the central dowel pin 146 to the outer perimeter of the soft magnetic body 140 and are spaced from adjacent radial slots 152 by angle α. Each of the radial slots 152 is spaced the same angle from adjacent radial slots 152, angle α, thus dividing the soft magnetic body 1140 into an even number of equal sized soft-magnet blocks 154a-j. The number of radial slots 152 and soft-magnet blocks 154a-j of the second magnetic platter 52 should match the number of radial slots 130 and soft-magnet blocks 134a-j of the first magnetic platter 48.

Each of the radial slots 152 is sized and configured to receive one of the permanent magnet plates 124, as described above. As with the first magnetic platter 48, the permanent magnet plates 124 are positioned within the plurality of radial slots 152 of the second magnetic platter 52 so that major faces of the same magnetic polarity are facing each other and into the same soft-magnet block 154a-j such that each soft-magnet block 154a-j is adjacent either only north magnetic faces or only south magnetic faces of the bordering permanent magnet plates 124, but not a north magnetic face and a south magnetic face. The north and south magnetic faces of each permanent magnet plate 124 are labelled as "N" and "S" in FIG. 8 for illustrative purposes. When in such a configuration, the soft-magnet blocks 154b, 154d, 154f, 154h, 154j that are adjacent north magnetic faces will have a north polarity while the soft-magnet blocks 154a, 154c, 154e, 154g, 154i that are adjacent south magnetic faces will have a south polarity. As a result, the soft-magnet blocks 154a-j alternate between north polarity blocks and south polarity blocks.

The second magnetic platter 52 also has an annular recess 156 extending into the bottom surface 144 and configured to receive the annular platter bushing 50. Particularly, when the first magnetic platter 48 is positioned and secured within the platter holder 62, the bushing 50 can then be placed in the annular recess 132 and the second magnetic platter 52 can then be placed over the first magnetic platter 48 with the central dowel pin 146 being inserted into the central hole 126 of the first magnetic platter 48. The bushing 50 will then be positioned between the first and second magnetic platters 48, 52 and within the annular recesses 132, 156. Thus, the bushing 50 spaces the first and second magnetic platters 48, 52 apart with second magnetic platter 52 riding on the bushing 50. The bushing 50 reduces friction when the second magnetic platter 52 is rotated. The bushing 50 can be made of brass, PTFE, or any other desired material that reduces friction.

Referring back to FIG. 5, the annular platter bushing 54 is cylindrical in shape, and sized and configured to be positioned about the circumference of the second magnetic platter 52 and within the platter holder 62. When the annular platter bushing 54 is positioned within the platter holder 62 it is supported by the inner annular shoulder 72. The annular platter bushing 54 centers the second magnetic platter 52 and reduces friction when the second magnetic platter 52 rotates. The annular platter bushing 54 be made of PTFE, brass, or any other desired material that reduces friction.

The top disc 56 includes an annular body 158 having a plurality of cut-outs 160. The top disc 56 is configured to be placed over the second magnetic platter 52 with the plurality of blocks 150 positioned within the cut-outs 160. As such, the cut-outs 160 are orientated and sized to match the plurality of blocks 150 that extend from the second magnetic platter 52 so that when the top disc 56 is placed over the second magnetic platter 52 each of the plurality of blocks 150 is positioned within one of the cut-outs 160 and the top disc 56 lies on the top surface 142 of the second magnetic platter 52. The top disc 56 reduces friction between the second magnetic platter 52 and the platter retention ring 58 when the second magnetic platter 52 is rotated. The top disc 56 can be made of PTFE, brass, or any other desired material that reduces friction.

The platter retention ring 58 includes a ring-shaped body 162 having a plurality of stops 164 that extend radially inward and a plurality of locking tabs 166 that extend radially outward. The top edge of the plurality of stops 164 can also be chamfered, which assists with centering and insertion of the cleat 12 during use. The locking tabs 166 are sized and spaced about the circumference of the ring-shaped body 162 to match the removed sections 76 of the platter holder 62. As such, the platter retention ring 58 is configured to be placed over the top disc 56 and the second magnetic platter 52 with the locking tabs 166 positioned and secured within the removed sections 76 of the platter holder 62. When the locking tabs 166 are positioned within the removed sections 76 of the platter holder 62, the platter retention ring 58 is prevented from rotating and secured in placed. The platter retention ring 58 can also be permanently secured to the platter holder 62 through a fastening means such as an adhesive or through welding. The platter retention ring 58, when secured to the platter holder 62, locks the second magnetic platter 52, the bushing 50, and the first magnetic platter 48 within the platter holder 62 so that they are axially constrained, but permits the second magnetic platter 52 to rotate with respect to the first magnetic platter 48 when engaged by the cleat 12.

Each of the plurality of stops 164 of the platter retention ring 58 are separated from an adjacent stop 164 by a gap 168. The gaps 168 are configured to receive the blocks 150 of the second magnetic platter 52 so that when the second magnetic platter 52 is rotated the blocks 150 ride within the gaps 168. Continued rotation of the second magnetic platter 52 results in the blocks 150 contacting the stops 164, which prevent the second magnetic platter 52 from further rotation. Accordingly, the stops 164 set the angular rotation of the second magnetic platter 52, and are therefore sized and spaced so that the second magnetic platter 52 can only be rotated by angle α, e.g., the angle that the permanent magnet plates 124 are from adjacent permanent magnet plates 124 as discussed in connection with FIGS. 8 and 9. Any attempt to rotate the second magnetic platter 52 further is prevented by the stops 164 engaging the blocks 150. Therefore, the stops 164 can be positioned to only allow 36° of rotation (e.g., for 10 plates), 30° of rotation (e.g., for 12 plates), 20° of rotation (e.g., for 18 plates), etc., depending on the number of permanent magnet plates 124. This configuration allows the second magnetic platter 52 to be rotated between a first position (e.g., an unaligned magnetically inactive position) and a second position (e.g., an aligned magnetically active position). In a preferred embodiment, the first magnetic platter 48 and the second magnetic platter 52 each include eighteen (18) permanent magnet plates 124, which require a preferred rotational angle of 20° for activation and deactivation.

Figure 10A:
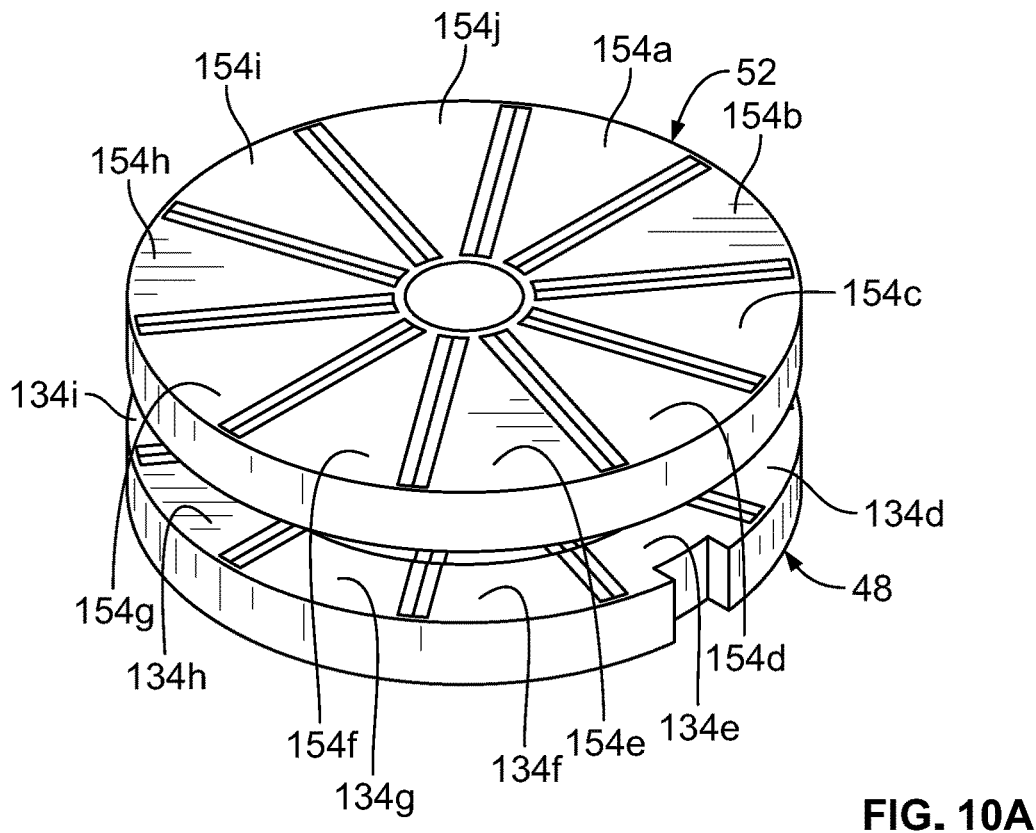
FIG. 10A is a partial perspective view of the second magnetic platter placed over the first magnetic platter in a first position.
Figure 10B:
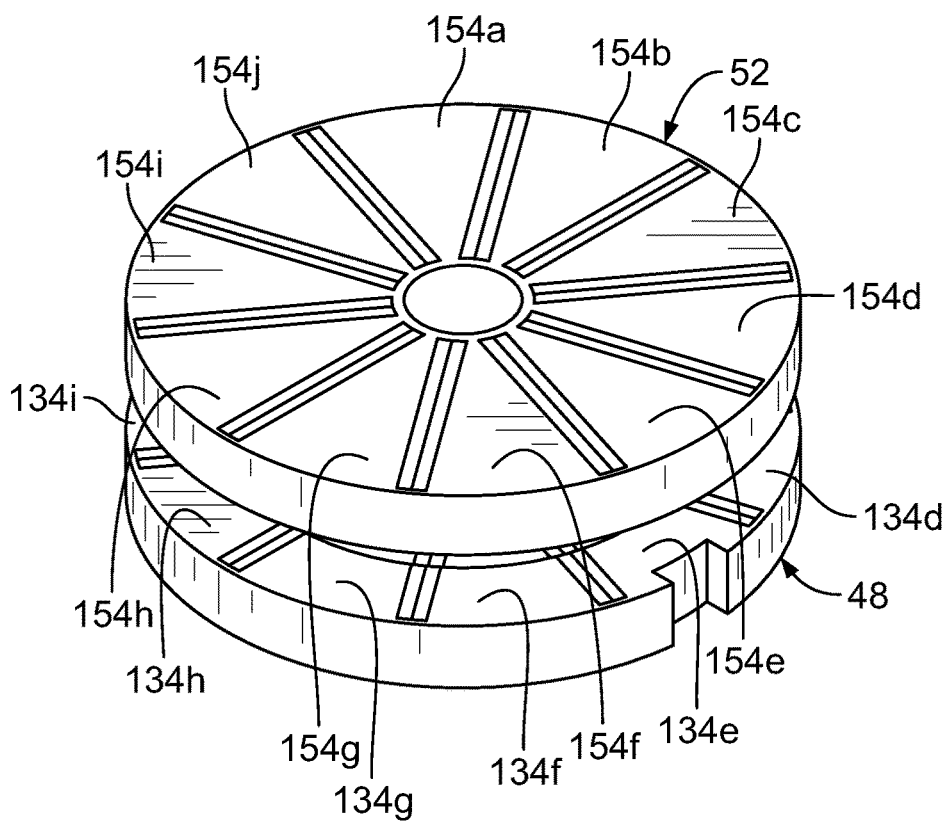
FIG. 10B is a partial perspective view of the second magnetic platter placed over the first magnetic platter in a second position.

FIG. 10A is a perspective view showing the first and second magnetic platters 48, 52 in a first position, and FIG. 10B is perspective view showing the first and second magnetic platters 48, 52 in a second position. It is noted that the second magnetic platter 52 is shown with some elements removed for convenience of illustration only in order to show the soft-magnet blocks 154a-j thereof overlapped with the soft-magnet blocks 134a-j of the first magnetic platter 48.

As shown in FIG. 10A, when the second magnetic platter 52 is in the first position, it overlaps the first magnetic platter 48 such that the north polarity soft-magnet blocks 154b, 154d, 154f, 154h, 154j of the second magnetic platter 52 overlay the south polarity soft-magnet blocks 134a, 134c, 134e, 134g, 134i of the first magnetic platter 48, and the south polarity soft-magnet blocks 154a, 154c, 154e, 154g, 154i of the second magnetic platter 52 overlay the north polarity soft-magnet blocks 134b, 134d, 134f, 134h, 134j of the first magnetic platter 48. More succinctly, the soft-magnet blocks overlaying each other are of opposite polarity. This is an "unaligned" position where the pedal 14 is in a magnetically inactive state, and the pedal 14 will not exert a significant external magnetic force. Specifically, by overlapping soft-magnet blocks of opposite polarity the magnetic flux lines are close-circuited, which prevents the magnetic force from extending beyond the first and second magnetic layers.

A user can rotate the second magnetic platter 52, e.g., through engagement of the cleat 12 with the keyed protrusion 148 of the second magnetic platter 52, by angle α to the second position shown in FIG. 10B. As shown in FIG. 10B, when the second magnetic platter 52 is in the second position, it overlaps the first magnetic platter 48 such that the north polarity soft-magnet blocks 154b, 154d, 154f, 154h, 154j of the second magnetic platter 52 overlay the north polarity soft-magnet blocks 134b, 134d, 134f, 134h, 134j of the first magnetic platter 48, and the south polarity soft-magnet blocks 154a, 154c, 154e, 154g, 154i of the second magnetic platter 52 overlay the south polarity soft-magnet blocks 134a, 134c, 134e, 134g, 134i of the first magnetic platter 48. More succinctly, the soft-magnet blocks overlaying each other are of the same polarity. This is an "aligned" position where the pedal 14 is in a magnetically active state, and the pedal 14 will exert a significant external magnetic force. Specifically, by overlapping soft-magnet blocks of the same polarity the magnetic flux lines are incomplete and open, which allows the magnetic force to extend beyond the second magnetic platter 52. Since the cleat 12 is implemented to rotate the second magnetic platter 52, the pedal 14 will be switched from the first position (the inactive state) to the second position (the active state) while the cleat 12 is adjacent the second magnetic platter 52. As a result, the magnetic force that is generated in the active state will be imparted on the cleat 12, which is formed of a ferrous metal, and secure the cleat 12 to the second magnetic platter 52 and the pedal 14. A contemplated range of force generated in the active state is 60-120 pound-force (lbf). The magnitude of the force is dictated by the size and thickness of the permanent magnet plates 124. As such, the size and thickness of the permanent magnet plates 124 utilized can be varied depending on desired implementation, e.g., the pedal 14 can be manufactured in low, medium, and high force variations each with varying size and thickness permanent magnet plates 124.

Figure 11A:
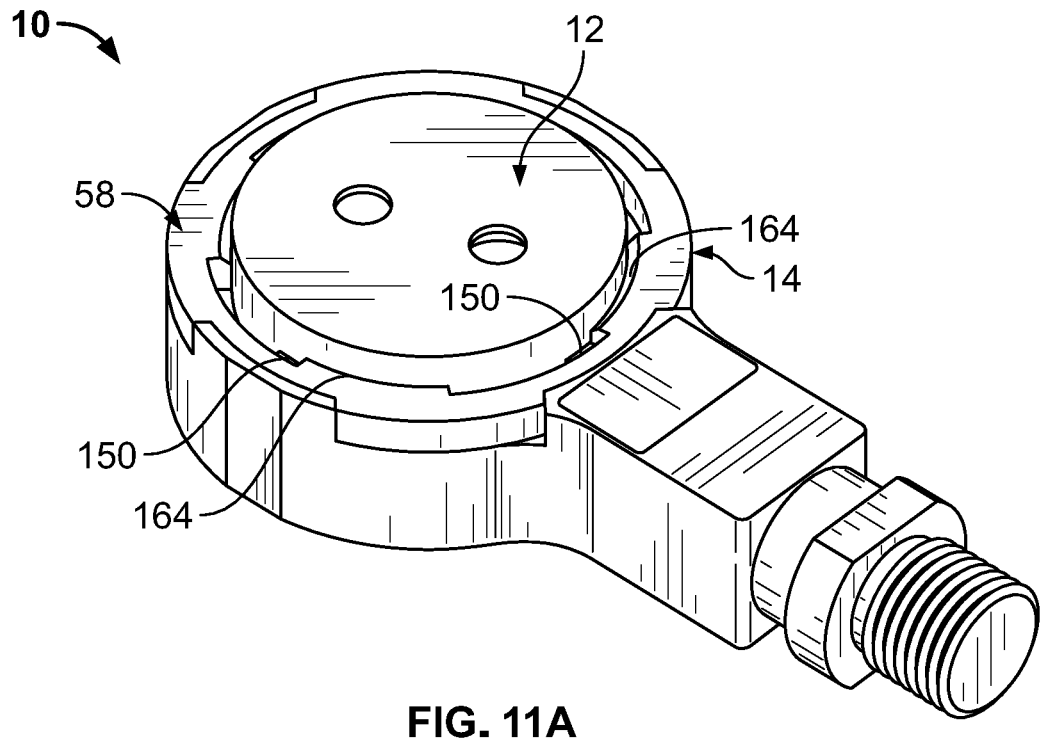
FIG. 11A is a perspective view of the magnetic engagement mechanism with the cleat connected with the pedal in a first position.
Figure 11B:
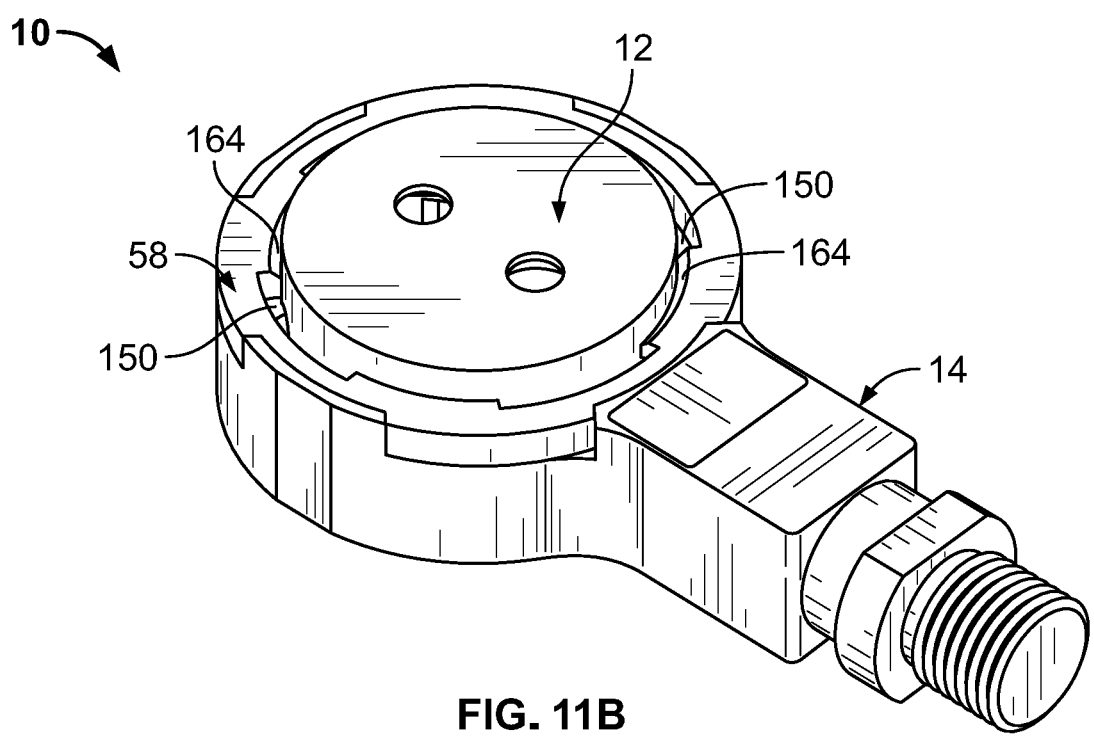
FIG. 11B is a perspective view of the magnetic engagement mechanism with the cleat connected with the pedal in a second position.

FIG. 11A is a perspective view of the cleat 12 connected with the pedal 14 in the first position, e.g., in an inactive state. FIG. 12A is a perspective view of the cleat 12 connected with the pedal 14 in the second position, e.g., in an active state. The cleat 12 is shown detached from the shoe 36 for ease of illustration and to show the position of the cleat 12 on the pedal 14, however, it should be understood that the cleat 12 would generally be utilized attached to the shoe 36. When the pedal is in the first position and inactive, the user can place their foot, including shoe 36 with attached cleat 12, on the pedal 14 and align the keyed recess 24 of the cleat 12 with the keyed protrusion 148 of the second magnetic platter 52. The chamfered edge of the platter retention ring 58 can assist with this alignment. Additionally, the keyed protrusion 148 can have a height greater than the platter retention ring 58 so that it extends beyond the platter retention ring 58 creating an edge for a user to locate with the cleat 12, which can assist with connecting the cleat 12 to the pedal 14.

Once the keyed recess 24 is aligned with the keyed protrusion 148, the user can press downward to seat the keyed protrusion 148 within the keyed recess 24. At this point, the user's foot will be angled with respect to the pedal 14 and a typical pedaling position. Once the keyed protrusion 148 is seated within the keyed recess 24, the user can rotate the second magnetic platter 52 into the second position. This is done by the user rotating their foot in a first direction, and therefore shoe 36 and attached cleat 12, to cause the cleat 12 to rotate the second magnetic platter 52. The second magnetic platter 52 can be rotated up to angle α, at which point the blocks 150 of the second magnetic platter 52 will contact the stops 164 of the platter retention ring 58 and prevent the second magnetic platter 52 from being rotated any further. This places the second magnetic platter 52 in the second position, e.g., an active state, causing the cleat 12 to be magnetically secured to the second magnetic platter 52. The user can then pedal the bicycle in a typical fashion and their shoe 36 will be secured to the pedal 14 through the magnetic engagement of the cleat 12 with the second magnetic platter 52. To release their shoe 36, the user twists their foot in a second direction opposite the first direction, which causes the cleat 12 to rotate the second magnetic platter 52 back to the first position where it is magnetically inactive. In the first position, as discussed above, minimal magnetic force is exerted from the pedal 14 on the cleat 12, allowing the user can pull the cleat 12 from engagement with the second magnetic platter 52. The above described functionality and operation holds true for both right and left shoes.

Figure 12:
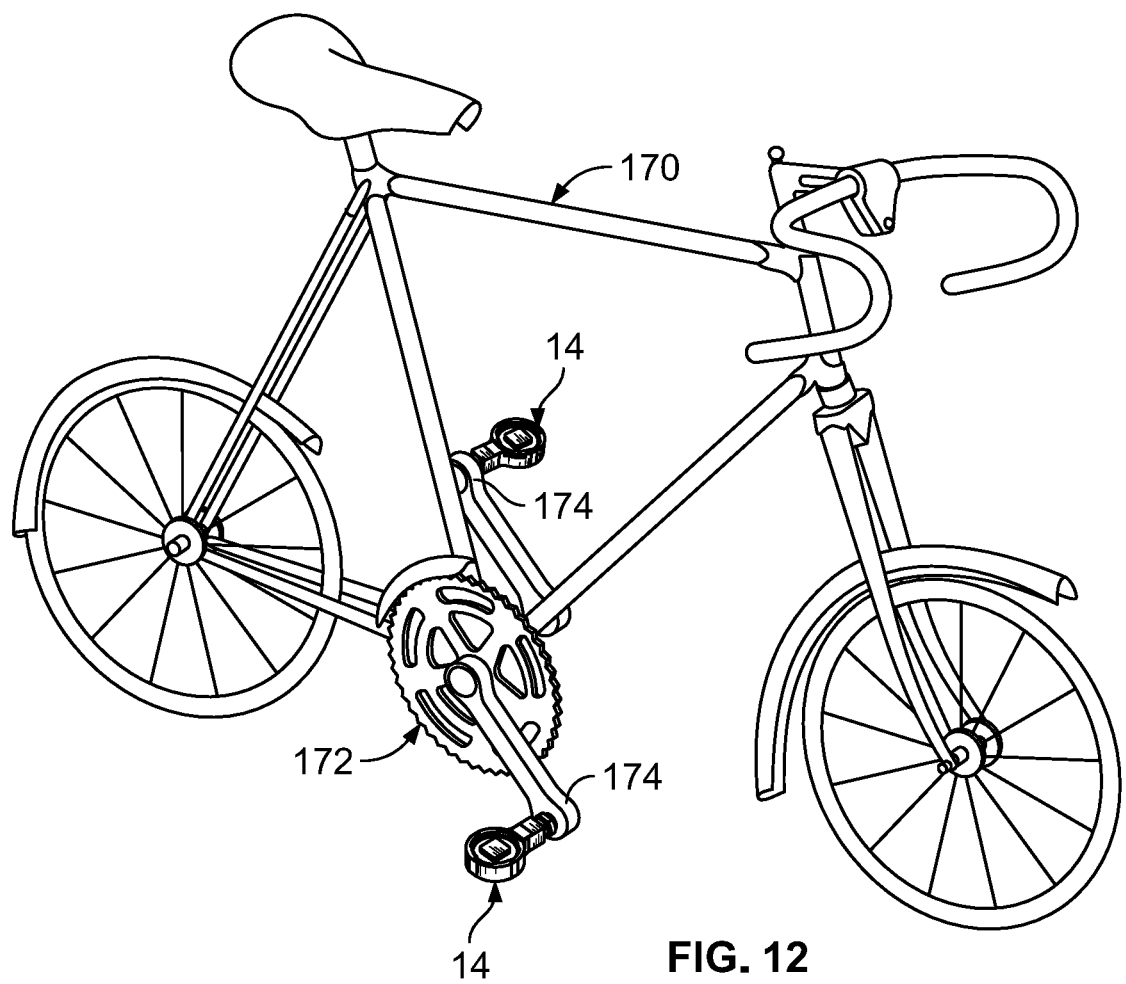
FIG. 12 is a perspective view of the pedal connected to a bicycle.

FIG. 12 is a perspective view showing the pedals 14 attached to a bicycle 170. As discussed above, the bicycle 170 includes a crankset 172 having crank arms 174. A pedal 14 can be connected to each of the crank arms 174 through a threaded engagement. Particularly, the threaded outer extension 106 (see FIG. 5) of the spindle 96 of the pedal 14 can threadedly engage the crank arms 174. The threaded outer extension 106 can be further tightened and secured to the crank arms 174 by a wrench or other tool turning the head 108 of the spindle 96.

Figure 13:
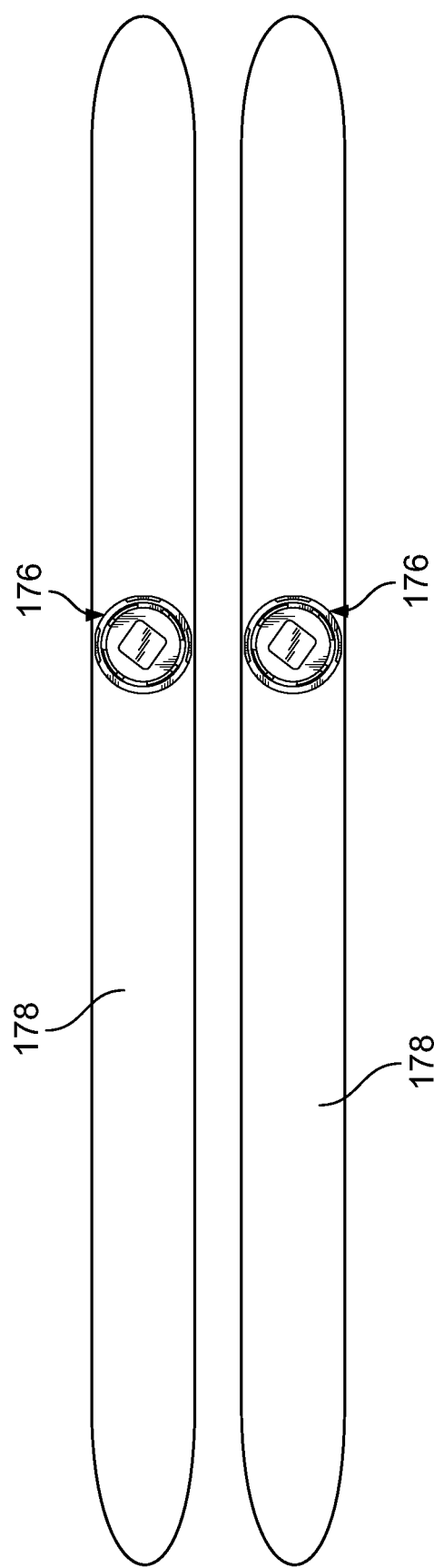
FIG. 13 is a perspective view of a binding secured to a pair of skis.

FIG. 13 is a perspective view of an alternative embodiment of the pedal 14 in the form of a binding 176 secured to a pair of skis 178. The binding 176 is similar in construction to the pedal 14, but without the stem 66 and spindle assembly 60. The binding 176 functions in the same fashion as the pedal 14, which need not be repeated. Thus, it should be understood that the above-description provided in connection with the pedal 14 holds true for the binding 176. The cleat 16 could be connected to the bottom of ski boots in place of cycling shoes 36 to allow a user to secure their ski boots to the skis 178. The binding 176 could alternatively be secured to other transportation apparatuses such as snowboards and water-skis, and exercise devices such as stationary bicycles.

It is also contemplated by the present disclosure for the pedal 14, binding 176, and cleat 16 to include a microprocessor and one or more sensors, and be Internet-of-Things (IOT) connected. Particularly, the microprocessor can be in wireless communication with a user's smartphone or smartwatch and relay parameters sensed by the one or more sensors thereto. The smartphone or smartwatch can then transfer this information to the Internet where it can be accessed by the user from various devices and locations. The parameters sensed by the one or more sensors can include force, rotation, speed, etc., and can be used to calculate various data, e.g., efficiency. This functionality allows a user to track their performance.

Figure 14:
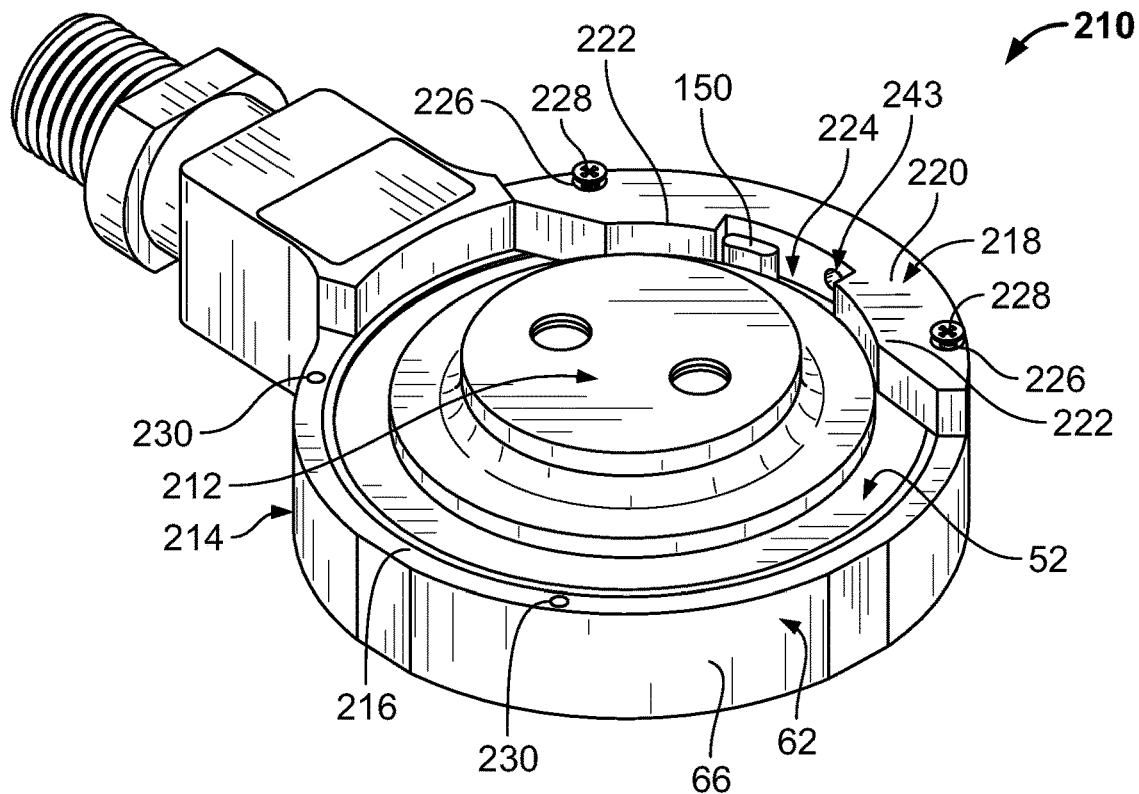
FIG. 14 is a perspective view of another embodiment of the magnetic engagement mechanism of the present disclosure.

FIG. 14 is a perspective view of another embodiment of a magnetic engagement mechanism 210 of the present disclosure having a modified cleat 212 and a modified pedal 214. The modified pedal 214 can be substantially similar in construction to the pedal 14 shown in FIG. 1, the details and components of which need not be repeated. It should be understood that the modified pedal 214 includes a number of the same components as the pedal 14 shown in FIGS. 1 and 5, and like component numbers are used for like components. The modified pedal 214 differs from the pedal 14 shown in FIG. 1 at least in that the annular sidewall 66 of the platter holder 62 does not include a plurality of abutments 78, and the modified pedal 200 does not include a platter retention ring 58. Instead, the annular sidewall 66 of the platter holder 62 terminates at an upper surface 216 that is substantially planar with the second magnetic platter 52. Additionally, the modified pedal 214 includes a bumper guide 218 in place of the platter retention ring 58. The bumper guide 218 can include a body 220 defining a plurality of stops 222 separated by a gap 224. The body 220 can also include a plurality of holes 226 (threaded or unthreaded) extending therethrough which facilitate mounting the bumper guide 218 to the platter holder 62. The bumper guide 218 can be secured to the platter holder 62 by a plurality of screws 228 that can extend through the holes 226 and threadedly engage a plurality of threaded holes 230 that extend through the upper surface 216 of the platter holder 62. The platter holder 62 can include four holes which allow the bumper guide 218 to be selectively mounted on opposite sides of the pedal 214, e.g., depending on if the pedal 214 is going to be placed on the right or left side of a bicycle.

The bumper guide 218 functions in a similar fashion to the platter retention ring 58 in that when it is secured to the platter holder 62 it locks the second magnetic platter 52, the bushing 50, and the first magnetic platter 48 within the platter holder 62 so that they are axially constrained, but permits the second magnetic platter 52 to rotate with respect to the first magnetic platter 48 when engaged by the cleat 12. Additionally, the bumper guide 218 acts as a front bumper wall that will contact the cleat 12, 212 and prevent a user's foot from sliding forward off of the pedal 214 when they are attempting to engage the cleat 12, 212 with the pedal 214.

In contrast to the platter retention ring 58, the bumper guide 218 spans only a portion of the circumference of the platter holder 62 instead of the entirety. For example, the bumper guide 218 can extend about one-quarter (¼) of the circumference of the platter holder 62, while leaving three-quarters (¾) of the circumference of the platter holder 62 open. This configuration assists with ease of insertion of the cleat 12, 212 as it allows a user to slide the cleat 12, 212 into the proper position and into engagement with the modified pedal 214, as opposed to having to inset the cleat 12, 212 into the platter retention ring 58.

Additionally, when the bumper guide 218 is secured to the platter holder 62, a block 150 of the second magnetic platter 52 is positioned within the gap 224 so that when the second magnetic platter 52 is rotated the block 150 rides within the gaps 224. Continued rotation of the second magnetic platter 52 results in the block 150 contacting the stops 222, which prevent the second magnetic platter 52 from further rotation. Accordingly, the stops 222 set the angular rotation of the second magnetic platter 52, and are therefore sized and spaced so that the second magnetic platter 52 can only be rotated by angle α, e.g., the angle that the permanent magnet plates 124 are from adjacent permanent magnet plates 124 as discussed in connection with FIGS. 8 and 9. Any attempt to rotate the second magnetic platter 52 further is prevented by the stops 222 engaging the block 150. Therefore, the stops 222 can be positioned to only allow 36° of rotation (e.g., for 10 plates), 30° of rotation (e.g., for 12 plates), 20° of rotation (e.g., for 18 plates), etc., depending on the number of permanent magnet plates 124. This configuration allows the second magnetic platter 52 to be rotated between a first position (e.g., an unaligned magnetically inactive position) and a second position (e.g., an aligned magnetically active position). In a preferred embodiment, the first magnetic platter 48 and the second magnetic platter 52 each include eighteen (18) permanent magnet plates 124, which require a preferred rotational angle of 20° for activation and deactivation.

Figure 15:
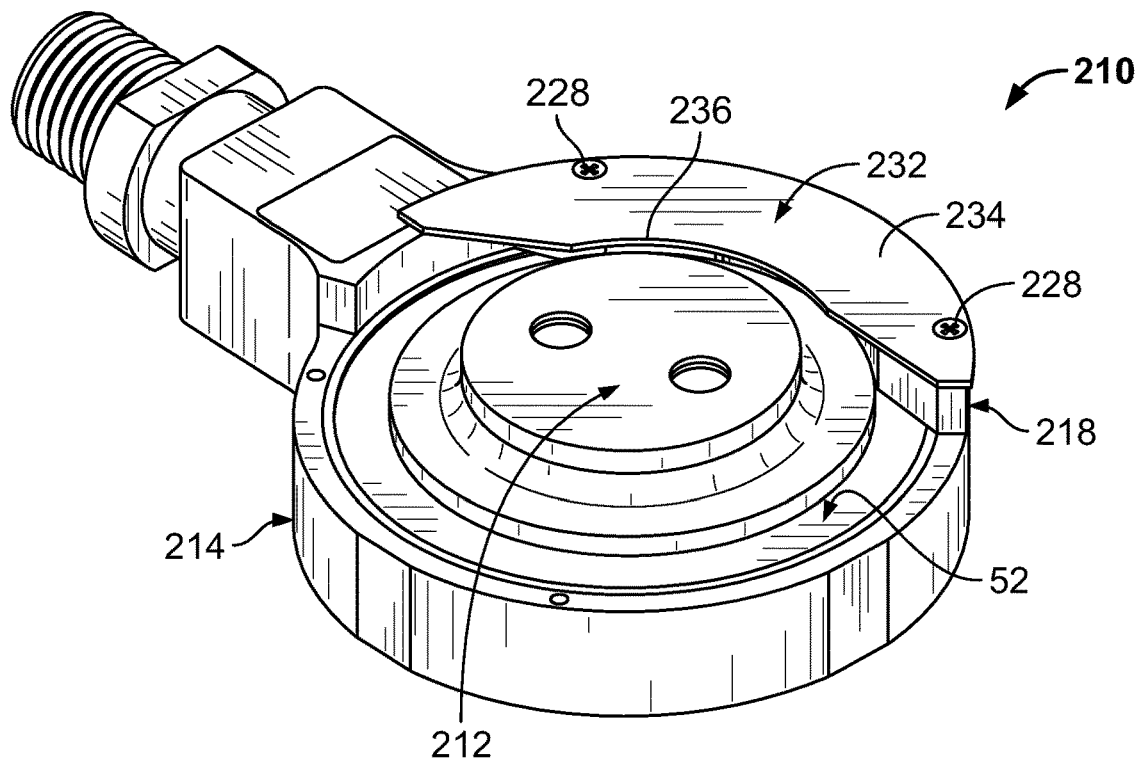
FIG. 15 is a perspective view of the magnetic engagement mechanism of FIG. 14 including a catch plate of the present disclosure.

FIG. 15 is a perspective view of the magnetic engagement mechanism 214 including a catch plate 232 of the present disclosure connected to the modified pedal 214. The catch plate 232 includes a curved body 234 defining an inner arcuate edge 236. The catch plate 232 can be secured to the bumper guide 218 or the platter retention ring 58 by screws 228, which extend through the curved body 234. Alternatively, the catch plate 232 can be integral with the bumper guide 218 or the platter retention ring 58. It should be understood that the catch plate 232 can be used with the pedal 14 shown in FIG. 1 or the modified pedal 214 shown in FIG. 14. The catch plate 232 functions to guide and align the cleat 12, 212 with the keyed protrusion 148 of the second magnetic platter 52 during insertion. That is, when a user attempts to engage the pedal 14, 214 with the cleat 12, 212, they can slide the cleat 12, 212 into engagement with the inner arcuate edge 236, which places the cleat 12, 212 directly above the keyed protrusion 148 of the second magnetic platter 52. The user can then rotate the cleat 12, 212 within the inner arcuate edge 236 until the cleat 12, 212 is aligned with the keyed protrusion 148, push downward to mate the keyed protrusion 148 with the cleat 12, 212, and then rotate the cleat 12, 212 to activate the magnetic circuit and secure the cleat 12, 212 to the pedal 14, 214.

Figure 16:
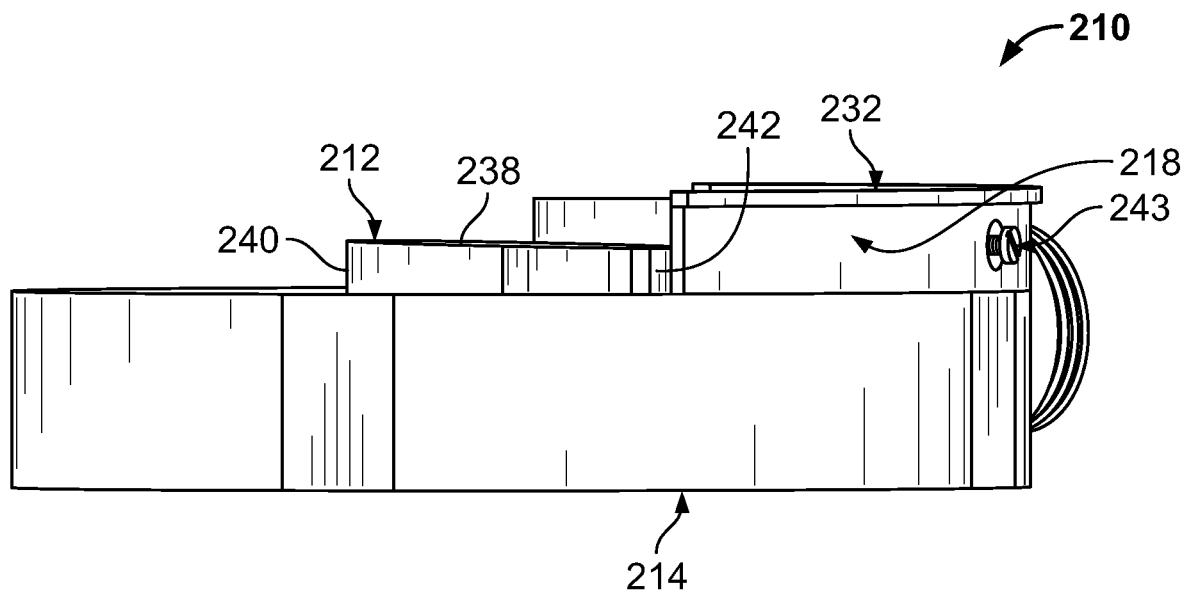
FIG. 16 is a side view of the modified pedal of FIG. 14 including a modified cleat.

FIG. 16 is a side view of the modified pedal 214 showing the modified cleat 212 in greater detail. The modified cleat 212 can be similar in construction to the cleat 12 shown in, for example, FIGS. 1 and 2, and includes the keyed recess 24 and keyed perimeter 26 shown in FIG. 2. However, the modified cleat 212 includes a slanted top surface 238 instead of a flat top surface 18 (see FIG. 1). The slanted top surface 238 can extend from a wider rear portion 240 to thinner front portion 242 of the modified cleat 212. When the cleat 212 is attached to a shoe 36 the wider rear portion 240 will extend below the thinner front portion 242 such that when a user attempts to engage the modified cleat 212 with the keyed protrusion 148 of the pedal 14, 214 the underside of the modified cleat 212 will contact the keyed protrusion 148 at an angle. This configuration exposes the keyed perimeter 26 of the modified cleat's keyed recess 24, allowing the keyed perimeter 26 to act as a "catch" on the keyed protrusion 148. Thus, the modified pedal 214 allows for a user to more easily engage the keyed protrusion 148 with the keyed recess 24.

The modified pedal 214 can also include a spring-loaded screw 243 that extends through the bumper guide 218 (see FIGS. 14 and 16). The spring-loaded screw 243 can be tightened by a user to cause it to be inserted through the bumper guide 218 and extend further toward the cleat 12, 212. Further insertion of the spring-loaded screw 243 can cause it place pressure on the cleat 12, 212 which can prevent premature deactivation of the magnetic circuit, e.g., release of the cleat 12, 212 from the pedal 214. It should be understood that the spring-loaded screw 243 can be utilized for both the modified pedal 214 as well as the pedal 14 shown in FIGS. 1 and 5.

Figure 17:
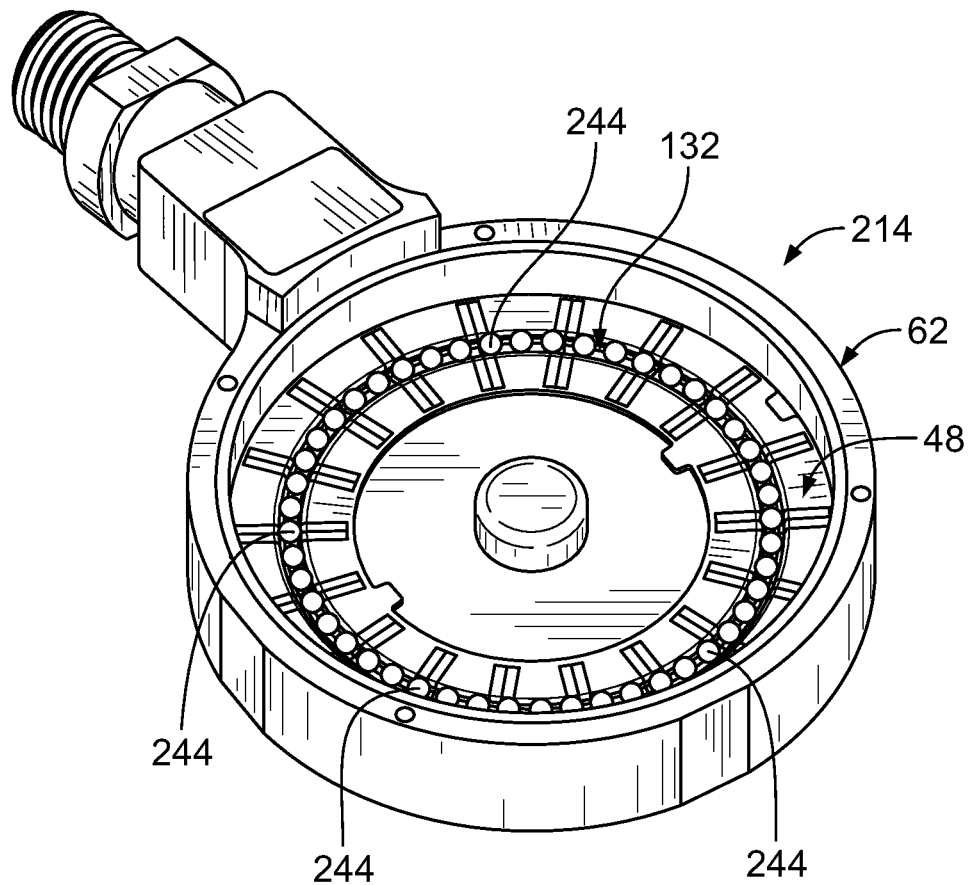
FIG. 17 is a perspective view of the interior of the modified pedal of FIG. 14 showing a plurality of ball bearings.

FIG. 17 is a perspective view of the modified pedal 214 showing the inclusion of a plurality of ball bearings 244. Specifically, the plurality of ball bearings 244 are placed in the annular recess 132 of the first magnetic platter 48 and replace the annular platter bushing 50 discussed in connection with FIGS. 5, 8, and 9. The plurality of ball bearings 244 are positioned between the first magnetic platter 48 and the second magnetic platter 52, and space the first and second magnetic platters 48, 52 apart with the second magnetic platter 52 riding on the ball bearings 244. The ball bearings 244 reduce friction due to rotation of the second magnetic platter 52 and smooth the rotation of the second magnetic platter 52.

Some embodiments of the present disclosure are directed to a pedal for a bicycle, comprising: a body; a spindle assembly rotatably secured to the body and configured to be connected to said bicycle; a first magnetic platter positioned and non-rotatably secured within the body, the first magnetic platter comprising: at least two blocks, and at least one permanent magnet plate having a magnetic north face and a magnetic south face, the at least one permanent magnet plate positioned between the at least two blocks with a first of the at least two blocks adjacent the magnetic north face and a second of the at least two blocks adjacent the magnetic south face, the at least one permanent magnet plate magnetizing the first of the at least two blocks with a magnetic north polarity and the second of the at least two blocks with a magnetic south polarity; and a second magnetic platter positioned and rotatably secured within the body overlaying the first magnetic platter, the second magnetic platter comprising: at least two blocks, at least one permanent magnet plate having a magnetic north face and a magnetic south face, the at least one permanent magnet plate positioned between the at least two blocks with a first of the at least two blocks adjacent the magnetic north face and a second of the at least two blocks adjacent the magnetic south face, the at least one permanent magnet plate magnetizing the first of the at least two blocks with a magnetic north polarity and the second of the at least two sections with a magnetic south polarity, and a keyed protrusion configured to be engaged by a ferrous metal cleat, wherein the second magnetic platter is rotatable by said ferrous metal cleat between a first position where the first of the at least two blocks of the second magnetic platter overlays the second of the at least two blocks of the first magnetic platter and the second of the at least two blocks of the second magnetic platter overlays the first of the at least two blocks of the first magnetic platter, and a second position where the first of the at least two blocks of the second magnetic platter overlays the first of the at least two blocks of the first magnetic platter and the second of the at least two blocks of the second magnetic platter overlays the second of the at least two blocks of the first magnetic platter, and wherein when the second magnetic platter is in the first position the pedal is in a magnetically inactive state and said cleat is not magnetically secured to the second magnetic platter, and when the second magnetic platter is in the second position the pedal is in a magnetically active state and said cleat is magnetically secured to the second magnetic platter.

Some embodiments of the present disclosure are further directed to a pedal for a bicycle, comprising: a body; a spindle assembly rotatably secured to the body and configured to be connected to said bicycle; a first magnetic platter positioned and non-rotatably secured within the body, the first magnetic platter comprising: an even number of permanent magnet plates each having a magnetic north face and a magnetic south face, and a plurality of blocks with at least one block of the plurality of blocks positioned between each adjacent pair of permanent magnet plates, the permanent magnet plates magnetizing each of the plurality of blocks with either a magnetic north polarity or a magnetic south polarity such that adjacent blocks are of opposite magnetic polarities; and a second magnetic platter positioned and rotatably secured within the body overlaying the first magnetic platter, the second magnetic platter comprising: an even number of permanent magnet plates each having a magnetic north face and a magnetic south face, and a plurality of blocks with at least one block of the plurality of blocks positioned between each adjacent pair of permanent magnet plates, the permanent magnet plates magnetizing each of the plurality of blocks with either a magnetic north polarity or a magnetic south polarity such that adjacent blocks are of opposite magnetic polarities, and a keyed protrusion configured to be engaged by a ferrous metal cleat, wherein the second magnetic platter is rotatable by said ferrous metal cleat between a first position where the magnetic south polarity blocks of the second magnetic platter overlay the magnetic north polarity blocks of the first magnetic platter and the magnetic north polarity blocks of the second magnetic platter overlay the magnetic south polarity blocks of the first magnetic platter, and a second position where the magnetic south polarity blocks of the second magnetic platter overlay the magnetic south polarity blocks of the first magnetic platter and the magnetic north polarity blocks of the second magnetic platter overlay the magnetic north polarity blocks of the first magnetic platter, and wherein when the second magnetic platter is in the first position the pedal is in a magnetically inactive state and said cleat is not magnetically secured to the second magnetic platter, and when the second magnetic platter is in the second position the pedal is in a magnetically active state and said cleat is magnetically secured to the second magnetic platter.

Some embodiments of the present disclosure are further directed to a magnetic engagement mechanism for a transportation apparatus, comprising: a body; a first magnetic platter positioned and non-rotatably secured within the body, the first magnetic platter comprising: an even number of permanent magnet plates each having a magnetic north face and a magnetic south face, and a plurality of blocks with at least one block of the plurality of blocks positioned between each adjacent pair of permanent magnet plates, the permanent magnet plates magnetizing each of the plurality of blocks with either a magnetic north polarity or a magnetic south polarity such that adjacent blocks are of opposite magnetic polarities; and a second magnetic platter positioned and rotatably secured within the body overlaying the first magnetic platter, the second magnetic platter comprising: an even number of permanent magnet plates each having a magnetic north face and a magnetic south face, and a plurality of blocks with at least one block of the plurality of blocks positioned between each adjacent pair of permanent magnet plates, the permanent magnet plates magnetizing each of the plurality of blocks with either a magnetic north polarity or a magnetic south polarity such that adjacent blocks are of opposite magnetic polarities, and a keyed protrusion configured to be engaged by a ferrous metal cleat, wherein the second magnetic platter is rotatable by said ferrous metal cleat between a first position where the magnetic south polarity blocks of the second magnetic platter overlay the magnetic north polarity blocks of the first magnetic platter and the magnetic north polarity blocks of the second magnetic platter overlay the magnetic south polarity blocks of the first magnetic platter, and a second position where the magnetic south polarity blocks of the second magnetic platter overlay the magnetic south polarity blocks of the first magnetic platter and the magnetic north polarity blocks of the second magnetic platter overlay the magnetic north polarity blocks of the first magnetic platter, and wherein when the second magnetic platter is in the first position the magnetic engagement mechanism is in a magnetically inactive state and said cleat is not magnetically secured to the second magnetic platter, and when the second magnetic platter is in the second position the magnetic engagement mechanism is in a magnetically active state and said cleat is magnetically secured to the second magnetic platter.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A pedal for a bicycle, comprising:
   a body;
   a means for securing the pedal to the bicycle;
   a first magnetic platter held by the body, the first magnetic platter including a first plurality of magnetizable blocks and at least one first permanent magnet plate magnetizing one or more of the first plurality of blocks with either a magnetic north polarity or a magnetic south polarity; and
   a second magnetic platter movable with respect to the first magnetic platter, the second magnetic platter including a second plurality of magnetizable blocks and at least one second permanent magnet plate magnetizing one or more of the second plurality of blocks with either a magnetic north polarity or a magnetic south polarity,
   wherein the second magnetic platter is movable with respect to the first magnetic platter by a cleat between (a) a first position wherein the pedal is in a magnetically inactive state and the cleat is not magnetically secured to the pedal, and (b) a second position wherein the pedal is in a magnetically active state and the cleat is magnetically secured to the pedal.

2. The pedal of claim 1, wherein the at least one first permanent magnet plate magnetizes a first block of the first plurality of blocks with a magnetic north polarity and a second block of the first plurality of blocks with a magnetic south polarity, and the at least one second permanent magnet plate magnetizes a first block of the second plurality of blocks with a magnetic north polarity and a second block of the second plurality of blocks with a magnetic south polarity.

3. The pedal of claim 2, wherein when in the first position the first block of the first plurality of magnetizable blocks having a magnetic north polarity overlays the second block of the second plurality of magnetizable blocks having a magnetic south polarity and the second block of the first plurality of magnetizable blocks having a magnetic south polarity overlays the first block of the second plurality of magnetizable blocks having a magnetic north polarity, and
   wherein when in the second position the first block of the first plurality of magnetizable blocks having a magnetic north polarity overlays the first block of the second plurality of magnetizable blocks having a magnetic north polarity and the second block of the first plurality of magnetizable blocks having a magnetic south polarity overlays the second block of the second plurality of magnetizable blocks having a magnetic south polarity.

4. The pedal of claim 1, wherein the second magnetic platter is movable with respect to the first magnetic platter by rotation.

5. The pedal of claim 1, wherein the first plurality of magnetizable blocks are angularly spaced and the second plurality of magnetizable blocks are angularly spaced.

6. The pedal of claim 1, wherein the second magnetic platter includes a keyed protrusion configured to be engaged by the cleat.

7. The pedal of claim 1, comprising a first plurality of first permanent magnet plates and a second plurality of second permanent magnet plates.

8. The pedal of claim 7, wherein the first plurality of first permanent magnet plates are angularly spaced, and the second plurality of second permanent magnet plates are angularly spaced.

9. The pedal of claim 1, wherein the first magnetic platter is non-rotatably secured within the body.

10. A pedal kit for use with a bicycle, comprising:
    a pedal securable to the bicycle, the pedal including:
      a body;
      a means for securing the pedal to the bicycle;
      a first magnetic platter held by the body, the first magnetic platter including a first plurality of magnetizable blocks and at least one first permanent magnet plate magnetizing one or more of the first plurality of blocks with either a magnetic north polarity or a magnetic south polarity; and
      a second magnetic platter movable with respect to the first magnetic platter, the second magnetic platter including a second plurality of magnetizable blocks and at least one second permanent magnet plate magnetizing one or more of the second plurality of blocks with either a magnetic north polarity or a magnetic south polarity; and
      a means for securing a shoe to the pedal, the means for securing a shoe to the pedal being connectable to a shoe,
      wherein the second magnetic platter is movable with respect to the first magnetic platter by the means for securing a shoe to the pedal between (a) a first position wherein the pedal is in a magnetically inactive state and the means for securing a shoe to the pedal is not magnetically secured to the pedal, and (b) a second position wherein the pedal is in a magnetically active state and the means for securing a shoe to the pedal is magnetically secured to the pedal.

11. The pedal kit of claim 10, wherein the means for securing a shoe to the pedal is at least partially formed of a ferromagnetic material.

12. The pedal kit of claim 10, wherein the at least one first permanent magnet plate magnetizes a first block of the first plurality of blocks with a magnetic north polarity and a second block of the first plurality of blocks with a magnetic south polarity, and the at least one second permanent magnet plate magnetizes a first block of the second plurality of blocks with a magnetic north polarity and a second block of the second plurality of blocks with a magnetic south polarity.

13. The pedal kit of claim 12, wherein when in the first position the first block of the first plurality of magnetizable blocks having a magnetic north polarity overlays the second block of the second plurality of magnetizable blocks having a magnetic south polarity and the second block of the first plurality of magnetizable blocks having a magnetic south polarity overlays the first block of the second plurality of magnetizable blocks having a magnetic north polarity, and wherein when in the second position the first block of the first plurality of magnetizable blocks having a magnetic north polarity overlays the first block of the second plurality of magnetizable blocks having a magnetic north polarity and the second block of the first plurality of magnetizable blocks having a magnetic south polarity overlays the second block of the second plurality of magnetizable blocks having a magnetic south polarity.

14. The pedal kit of claim 10, wherein the second magnetic platter is movable with respect to the first magnetic platter by rotation.

15. The pedal kit of claim 10, wherein the first plurality of magnetizable blocks are angularly spaced and the second plurality of magnetizable blocks are angularly spaced.

16. The pedal kit of claim 10, wherein the second magnetic platter includes a keyed protrusion configured to be engaged by the means for securing a shoe to the pedal.

17. The pedal kit of claim 10, comprising a first plurality of first permanent magnet plates and a second plurality of second permanent magnet plates.

18. The pedal kit of claim 17, wherein the first plurality of first permanent magnet plates are angularly spaced, and the second plurality of second permanent magnet plates are angularly spaced.

19. The pedal kit of claim 10, wherein the first magnetic platter is non-rotatably secured within the body.

\* \* \* \* \*

UNITED STATES PATENT AND TRADEMARK OFFICE
CERTIFICATE OF CORRECTION

PATENT NO. : 11,530,014 B2
APPLICATION NO. : 17/165407
DATED : December 20, 2022
INVENTOR(S) : Steven Ball It is certified that error appears in the above-identified patent and that said Letters Patent is hereby corrected as shown below:

On the Title Page

Item (71), Smart Clips LLC city and state, namely "Basking Ridge, NJ (US)" should be deleted and replaced with "Sarasota, FL (US)"

Signed and Sealed this
Fifth Day of March, 2024

Katherine Kelly Vidal
*Director of the United States Patent and Trademark Office*